(12) United States Patent
Tabata et al.

(10) Patent No.: US 11,505,463 B2
(45) Date of Patent: Nov. 22, 2022

(54) OZONE GAS USAGE SYSTEM

(71) Applicant: TOSHIBA MITSUBISHI-ELECTRIC INDUSTRIAL SYSTEMS CORPORATION, Chuo-ku (JP)

(72) Inventors: Yoichiro Tabata, Tokyo (JP); Yuji Ono, Tokyo (JP); Takasho Sato, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 18 days.

(21) Appl. No.: 16/637,377

(22) PCT Filed: Aug. 9, 2017

(86) PCT No.: PCT/JP2017/028921
§ 371 (c)(1),
(2) Date: Feb. 7, 2020

(87) PCT Pub. No.: WO2019/030852
PCT Pub. Date: Feb. 14, 2019

(65) Prior Publication Data
US 2020/0207620 A1 Jul. 2, 2020

(51) Int. Cl.
C01B 13/11 (2006.01)
B01J 35/00 (2006.01)

(52) U.S. Cl.
CPC ............ C01B 13/11 (2013.01); B01J 35/004 (2013.01)

(58) Field of Classification Search
CPC ......... C01B 13/11; C01B 13/10; C01B 13/15; C01B 2201/00; C01B 2201/90;
(Continued)

(56) References Cited

U.S. PATENT DOCUMENTS 4,872,102 A * 10/1989 Getter .................. H02M 7/003
363/141
2004/0149234 A1* 8/2004 Mathur ................ A01K 63/042
119/263
(Continued)

FOREIGN PATENT DOCUMENTS

CN 1976870 B 8/2012
CN 103688322 3/2014
(Continued)

OTHER PUBLICATIONS

Japanese Office Action dated Jan. 19, 2021 in Japanese Patent Application No. 2019-535502 (with English translation), 6 pages.
(Continued)

Primary Examiner — Xiuyu Tai
(74) Attorney, Agent, or Firm — Oblon, McClelland, Maier & Neustadt, L.L.P.

(57) ABSTRACT

A small-scale application apparatus including an ozone generation apparatus configured to generate ozone gas, the application apparatus being configured to perform ozone usage processing. The ozone generation apparatus includes a load-resonant high-frequency step-up transformer configured to obtain a stepped-up high-frequency voltage and an ozone generator configured to receive the stepped-up high-frequency voltage as an operating voltage to generate the ozone gas having an ozone concentration of at least 200 g/m$^3$ from raw gas containing oxygen gas. The application apparatus receives the ozone gas under a pressure environment of at least 0.2 MPa.

14 Claims, 10 Drawing Sheets

(58) Field of Classification Search
CPC ............ C01B 2201/64; C01B 2201/66; C01B 2201/12; C01B 2201/74; C01B 2201/76; B01J 19/08; B01J 9/088; B01J 35/004; B01J 35/004; H05H 1/46; H05H 1/24; H05H 2242/20; H02M 7/48; H02M 7/4818; H02M 7/4815; H02M 1/32; H02M 7/003; C02F 1/78; C02F 2103/08; C02F 2103/008; C02F 2201/782; H05K 7/209; H05B 45/382; Y02B 70/10; Y02P 20/10; Y02W 10/37; H01F 27/322; H01F 27/025; H01F 27/10; H01F 5/00; H01F 27/327; H01F 3/00; H01F 27/2876; H01F 2027/328

See application file for complete search history.

(56) References Cited

U.S. PATENT DOCUMENTS

| | | | |
|---|---|---|---|
| 2006/0049738 | A1 | 3/2006 | Tabata et al. |
| 2010/0101936 | A1 | 4/2010 | Hansson |
| 2014/0030152 | A1* | 1/2014 | Nishimura .............. C01B 13/11 422/111 |
| 2014/0132381 | A1* | 5/2014 | Weber .................. H01F 27/322 336/60 |
| 2016/0234925 | A1* | 8/2016 | Tabata ..................... H05H 1/46 |

FOREIGN PATENT DOCUMENTS

| | | |
|---|---|---|
| CN | 204779153 U | 11/2015 |
| CN | 103459308 | 2/2016 |
| CN | 205874110 U | 1/2017 |
| JP | 48-32483 | 10/1973 |
| JP | 6-20770 A | 1/1994 |
| JP | 2002-11485 A | 1/2002 |
| JP | 2004-223404 A | 8/2004 |
| JP | 3642572 B2 | 4/2005 |
| JP | 2006-212493 A | 8/2006 |
| JP | 2007-183381 A | 7/2007 |
| JP | 4825314 B2 | 11/2011 |
| JP | 4932037 B2 | 5/2012 |
| JP | 4953814 B2 | 6/2012 |
| JP | 5069800 B2 | 11/2012 |
| JP | 5121944 B2 | 1/2013 |
| JP | 2014-171954 A | 9/2014 |
| TW | 200523206 | 7/2005 |
| TW | 201720754 A | 6/2017 |
| WO | WO 2005/080264 A1 | 9/2005 |
| WO | WO 2015049781 * | 4/2015 |

OTHER PUBLICATIONS

International Search Report dated Nov. 7, 2017 in PCT/JP2017/028291 filed on Aug. 9, 2017, 2 pages.
Taiwanese Office Action dated Jun. 25, 2018 in Taiwanese Patent Application No. 106138439 (with partial unedited computer-generated English translation), 16 total pages.
Extended European Search Report dated Feb. 23, 2021 in European Patent Application No. 17920701.4, 7 pages.
International Preliminary Report on Patentability and Written Opinion of the International Searching Authority dated Feb. 20, 2020 in PCT/JP2017/028921 filed Aug. 9, 2017 (with English translation), 13 pages.
Japanese Office Action dated Aug. 3, 2021 in Japanese Patent Application No. 2019-535502 (with English translation), 8 pages.
Korean Office Action dated Aug. 23, 2021 in Korean Patent Application No. 10-2020-7003266 (with English translation), 12 pages.
Office Action dated Jan. 11, 2022, in Japanese Patent Application No. 2019-535502 w/English Machine Translation.
Japanese Office Action (Decision of Dismissal of Amendment) dated Jun. 14, 2022 in Japanese Patent Application No. 2019-535502 (with English translation), 9 pages.
Office Action dated Sep. 2, 2022 in Chinese Application No. 201780093738.9 (with Computer Generated English Translation).

* cited by examiner

OZONE GAS USAGE SYSTEM

TECHNICAL FIELD

The present invention relates to an ozone gas usage system and an application apparatus, the ozone gas usage system including the application apparatus configured to perform ozone usage processing with ozone gas generated by an ozone generation processing apparatus and being made small in size and high in efficiency, the application apparatus being configured to perform the ozone usage processing with ozone gas that is made low in load on an environment.

BACKGROUND ART

Examples of a conventional ozone generation technology include an ozone generation technology for generating high-concentration ozone gas with high efficiency using discharge. For such an ozone generation technology using discharge, for example, Patent Document 1 discloses a technology achieved by a combination of raw gas and a discharge surface material, and Patent Documents 2 to 6 disclose technologies related to a discharge surface material.

As disclosed in Patent Document 1, in an ozone generator capable of generating high-concentration ozone having a concentration of at least 200 $[g/m^3]$, gas resulting from adding nitrogen gas to oxygen gas by 0.1 to several percent is used as raw gas to be supplied. Then, when the nitrogen gas thus added by a trace amount becomes nitrogen oxide gas by discharge, this trace amount of nitrogen oxide gas acts as a catalyst to dissociate a large amount of oxygen molecules to generate high-concentration oxygen atoms. This in turn allows high-concentration ozone to be generated by a three-body collision reaction between the high-concentration oxygen atoms and oxygen molecules generated by the action of the nitrogen oxide.

Conventionally, most commercially available ozone generation apparatuses are classified into a technology for generating ozone from raw gas resulting from adding nitrogen gas to oxygen gas by at least 0.1% (1000 ppm to several percent (ten thousand ppm)) and a technology for generating ozone gas by a chemical reaction between oxygen and a discharge surface rather than raw gas. The technologies are disclosed in Patent Document 1. Many of the conventional ozone generation apparatuses employ the former technology for generating ozone from raw gas resulting from adding a trace amount of nitrogen gas to oxygen gas, in which an amount of oxygen atoms generated by catalytic action of the nitrogen gas (action causing oxygen atoms to be generated by catalytic action based on discharge photocatalysis of generated nitrogen oxide gas and chemical reaction of the nitrogen oxide gas) is much larger than an amount of oxygen atoms dissociated by collision of oxygen molecules of electrons generated by discharge, and high-concentration ozone gas is generated from most of the amount of oxygen atoms.

Therefore, since most of the commercially available ozone generation apparatuses need to add nitrogen gas to raw gas, when ozone is generated, the apparatuses accordingly generate NOx such as nitrogen dioxide and nitrogen monoxide of about several ten to several hundred ppm corresponding to about several to several ten percent of the amount of nitrogen thus added, and a measure to remove NOx that is high in load on the environment is not sufficiently applied to most of the conventional ozone generation apparatuses.

Further, in the technologies disclosed in Patent Documents 2 to 6, ozone is generated by applying a photocatalyst substance to a discharge surface to generate a large amount of oxygen atoms without adding nitrogen gas to raw gas (nitrogen-free ozone generation apparatus and nitrogen-free ozone generation technology), and thus the technologies make it possible to generate ozone gas with high efficiency with little nitrogen gas added to raw gas and in turn make it possible to provide an ozone generation apparatus that prevents NOx such as nitrogen dioxide and nitrogen monoxide from being contained in the generated high-concentration ozone gas and is thus low in load on the environment.

PRIOR ART DOCUMENTS

Patent Documents

Patent Document 1: Japanese Patent No. 3642572
Patent Document 2: Japanese Patent No. 4953814
Patent Document 3: Japanese Patent No. 5069800
Patent Document 4: Japanese Patent No. 4825314
Patent Document 5: Japanese Patent No. 4932037
Patent Document 6: Japanese Patent No. 5121944

SUMMARY

Problem to be Solved by the Invention

Recently, ozone generation apparatuses using such an ozone generation technology have been coming into wide use. Such ozone generation apparatuses are, however, large in electric capacity, ozone generation capacity, and volume, and have various difficulties such as preparation of a power supply source, preparation of raw gas, and preparation of an apparatus installation place, and thus have been applied to only few application apparatuses that perform ozone usage processing using ozone gas.

Further, many commercially available ozone generation apparatuses use a large discharge ozone generation apparatuses that generate ozone gas from raw gas resulting from adding nitrogen to oxygen gas by about 1% (10000 ppm). This forces the conventional ozone generation apparatuses to generate, due to discharge when ozone is generated, NOx such as nitrogen dioxide and nitrogen monoxide of about several ten to several hundred ppm corresponding to about several to several ten percent of the amount of nitrogen thus added. For this reason, the use of ozone gas generated by such conventional ozone generation apparatuses results in the use of ozone gas containing NOx gas, resulting in an insufficient application of the measure to remove NOx that is high in load on the environment.

An ozone generation apparatus that is large in electric capacity and ozone generation capacity is an apparatus suitable for an ozone gas usage system designed to be used in a large-scale processing plant having a very large ozone processing capacity. Such a relatively large-scale ozone generation apparatus has a very large apparatus volume, which greatly increases a size of a raw gas facility and increases a size of an application apparatus that performs ozone usage processing. Further, since the electric capacity of the ozone generation apparatus is large, it is difficult to prepare a power supply source for the ozone generation apparatus. Therefore, such a relatively large-scale ozone generation apparatus disallows a small-scale ozone gas usage system that is suitable for use in a remote area or remote island and includes an application apparatus that uses ozone gas to be built.

Further, the Ballast Water Management Convention adopted by the International Maritime Organization (IMO) in 2004 for water used in large passenger ships and ballast water in ships such as container ships and crude oil tankers makes it mandatory for all international sea going ships including ships placed in service before 2017 to be equipped with apparatuses that perform water processing (sterilization and degerming) to keep the number of organisms in water or ballast water equal to or less than a certain amount, which leads to an increase in demand for small-scale water processing apparatuses that use ozone gas. However, such water processing apparatuses including small-scale ozone generation apparatuses have not been sufficiently put into practical use for water processing on water used in large passenger ships or ballast water in container ships, crude oil tankers, and the like.

Furthermore, conventional application apparatuses that use ozone gas use ozone gas generated by a large-scale discharge-type ozone generation apparatus, the ozone gas resulting from adding nitrogen to oxygen gas by about 1% (10000 ppm). That is, in such conventional application apparatuses, NOx such as nitrogen dioxide and nitrogen monoxide of about several ten to several hundred ppm corresponding to about several to several ten percent of the amount of nitrogen thus added is generated by discharge when ozone is generated, and such ozone gas containing NOx gas is used, resulting in an insufficient application of the measure to remove NOx that is high in load on the environment.

In recent years, it is getting important to reduce emissions of environmental load substances emitted by factory business activities or from automobiles such as greenhouse gases (GHG) that contribute to global warming, sulfur oxides (SOx), soot, volatile organic compounds (VOC), and it is thus desired that an ozone generation apparatuses be an apparatus that reduces the amount of NOx contained in ozone gas.

The present invention has been made to solve the above-described problems, and an object of the present invention primarily include two objects (inventions), one of which is to achieve a reduction in size of a system configuration, and the other of which is to more desirably provide an ozone gas usage system that achieves a reduction in amount of NOx contained in ozone gas (object of improving environment).

Means to Solve the Problem

An ozone gas usage system according to the present invention includes a raw gas supply apparatus configured to supply raw gas containing oxygen gas, an ozone generation apparatus configured to generate ozone gas from the raw gas, and an application apparatus configured to perform ozone usage processing to obtain a post-ozone processing substance from a pre-ozone processing substance using the ozone gas. The ozone generation apparatus includes an inverter power source configured to generate a supply high-frequency voltage, a resonant transformer configured to step up the supply high-frequency voltage to obtain a stepped-up high-frequency voltage, and an ozone gas generator configured to receive the stepped-up high-frequency voltage from the resonant transformer as an operating voltage to generate, from the raw gas, the ozone gas having an ozone concentration of at least 200 $g/m^3$. The application apparatus receives the ozone gas under a pressure environment of at least 0.2 MPa.

Effects of the Invention

In the ozone gas usage system according to the present invention, since the application apparatus receives ozone gas having a relatively high ozone concentration of at least 200 $g/m^3$, it is possible to make the apparatus configuration compact by reducing the supply amount of the ozone gas itself.

Furthermore, since the application apparatus receives the ozone gas from the ozone generation apparatus under a pressure environment of at least 0.2 MPa, it is possible to increase the processing capacity in the ozone usage processing.

The object, features, aspects, and advantages of the present invention will become more apparent from the following detailed description and the accompanying drawings.

DESCRIPTION OF EMBODIMENT

Embodiment

Basic Configuration

Figure 1:
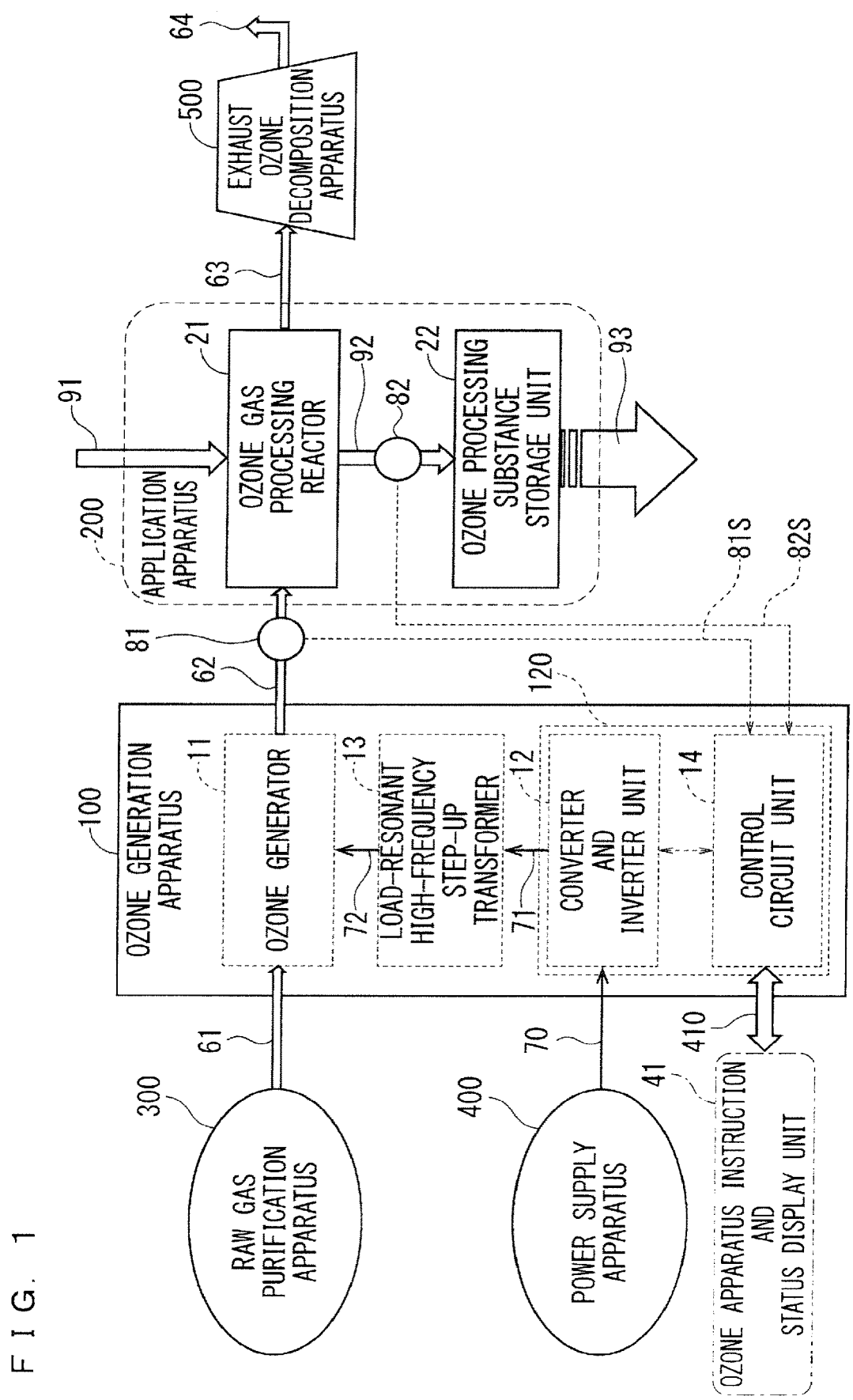
FIG. 1 is an explanatory diagram showing a configuration of an ozone gas usage system according to an embodiment of the present invention.
Figure 2:
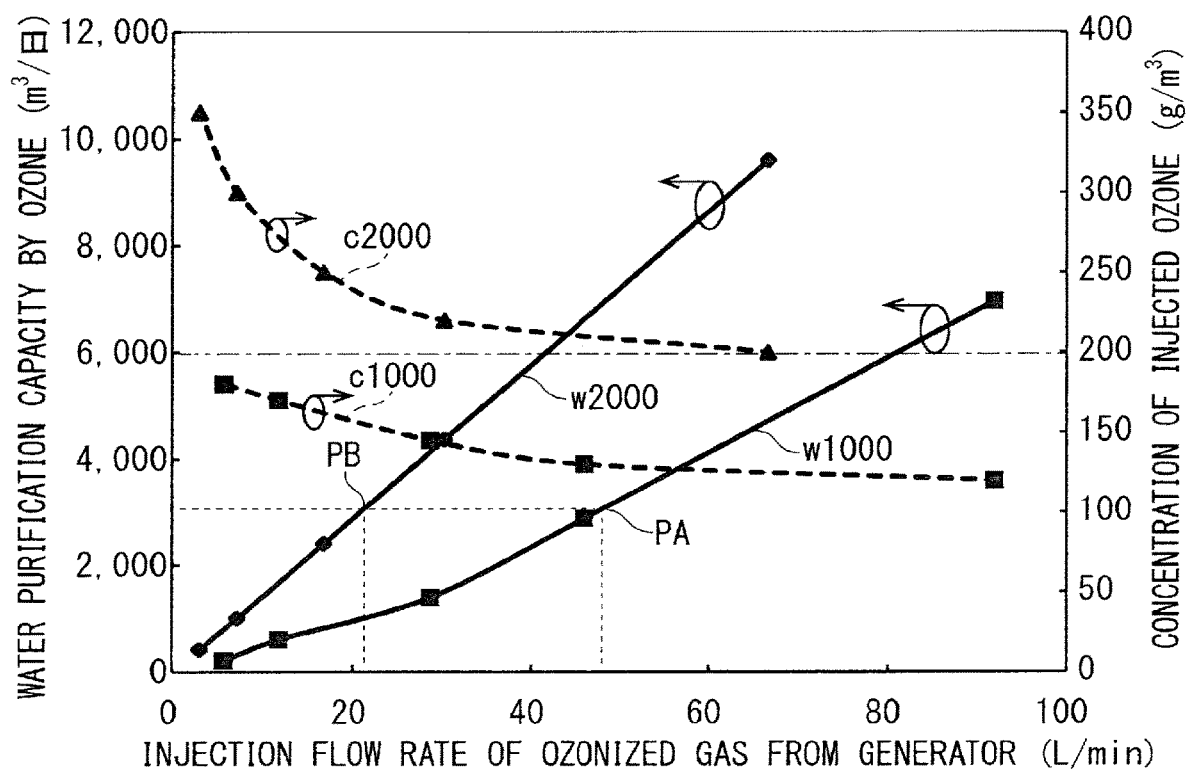
FIG. 2 is a graph showing an effect of the ozone gas usage system according to the embodiment.
Figure 3:
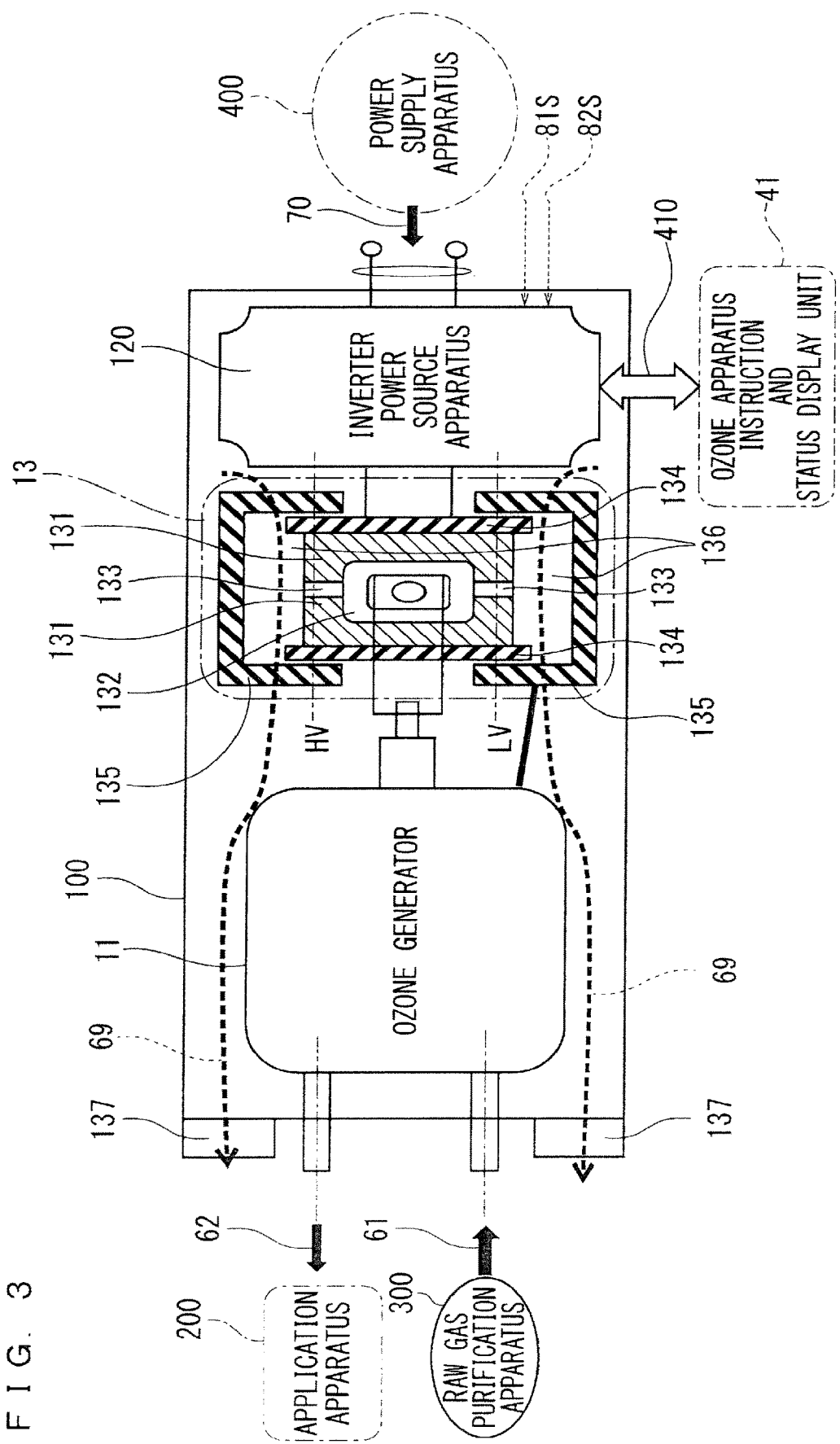
FIG. 3 is an explanatory diagram showing an internal configuration of an ozone generation apparatus shown in FIG. 1.
Figure 4:
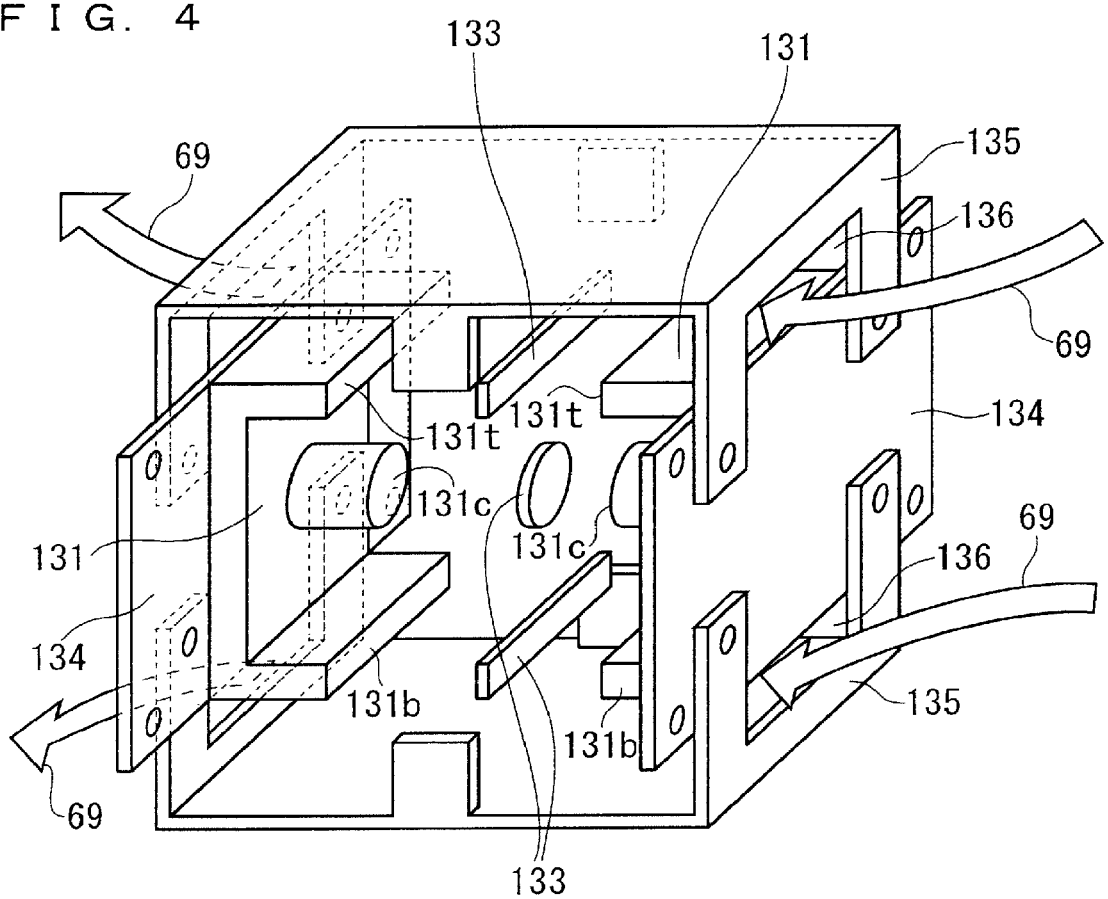
FIG. 4 is an explanatory diagram (part 1) showing details of an internal structure of a load-resonant high-frequency step-up transformer shown in FIG. 3.
Figure 5:
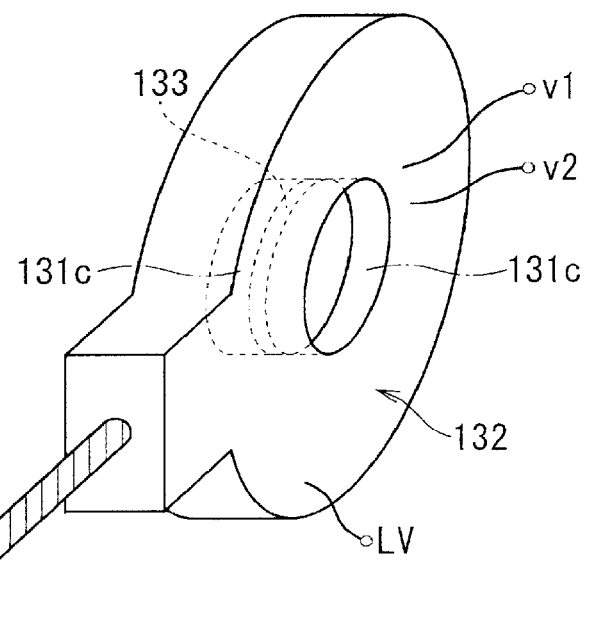
FIG. 5 is an explanatory diagram (part 2) showing details of the internal structure of the load-resonant high-frequency step-up transformer shown in FIG. 3.

FIG. 1 is an explanatory diagram showing a configuration of an ozone gas usage system according to an embodiment of the present invention. FIG. 2 is a graph showing an effect of the ozone gas usage system according to a first embodiment, specifically showing a relationship between a concentration of ozone injected from an ozone generation apparatus 100 to an application apparatus 200 and a water purification capacity of ozone. FIG. 3 is an explanatory diagram showing an internal configuration of the ozone generation apparatus 100 used in the ozone gas usage system according to the first embodiment. FIG. 4 and FIG. 5 are explanatory diagrams showing details of an internal structure of a load-resonant high-frequency step-up transformer 13 shown in FIG. 3, FIG. 5 shows a structure of a transformer molded coil 132, and FIG. 4 shows a structure without the transformer molded coil 132.

The ozone generation apparatus 100 shown in FIG. 1 is a nitrogen-free ozone generation apparatus that has a discharge surface material in an ozone generator to be described later formed of a specific photocatalyst material so as to generate high-concentration ozone gas containing no NOx gas. In other words, the nitrogen-free ozone generation apparatus is a small-scale ozone generation apparatus capable of extracting high-concentration ozone gas even when oxygen gas to which no nitrogen has been added or high-purity oxygen gas having a purity of at least 99.99% is used as raw gas.

As shown in FIG. 1, the ozone gas usage system according to the first embodiment primarily includes the ozone generation apparatus 100, the application apparatus 200, a raw gas purification apparatus 300, a power supply apparatus 400, an exhaust ozone decomposition apparatus 500, and an ozone apparatus instruction and status display unit 16.

The application apparatus 200 performs ozone usage processing using ozone gas 62 generated by the ozone generation apparatus 100. The ozone usage processing is processing for obtaining a post-ozone processing substance 92 from a pre-ozone processing substance 91 with ozone gas.

The raw gas purification apparatus 300 is an apparatus of a raw material supply type that supplies oxygen gas having a purity of at least 99.99% as raw gas to the ozone generation apparatus 100.

The power supply apparatus 400 supplies a supply power source 70 serving as an operating power source for the ozone generation apparatus 100 to the ozone generation apparatus 100.

The exhaust ozone decomposition apparatus 500 is an apparatus that receives exhaust ozone gas 63 discharged after use in the ozone usage processing in the application apparatus 200 to decompose the exhaust ozone gas 63 to obtain processed gas 64.

As shown in FIG. 1, the ozone generation apparatus 100 primarily includes an ozone generator 11, an inverter power source apparatus 120, and the load-resonant high-frequency step-up transformer 13. The inverter power source apparatus 120 is an apparatus that electrically controls a high-frequency voltage applied to the ozone generator 11 and includes a converter and inverter unit 12 serving as a main power source, and a control circuit unit 14 that controls a high-frequency voltage 71 (supply high-frequency voltage) supplied by the converter and inverter unit 12.

The high-frequency voltage 71 generated by the converter and inverter unit 12 of the inverter power source apparatus 120 is stepped up by the load-resonant high-frequency step-up transformer 13 and applied to the ozone generator 11 as a stepped-up high-frequency voltage 72. Therefore, the ozone generator 11 is capable of performing ozone gas generation processing using the stepped-up high-frequency voltage 72 as the operating voltage to generate the ozone gas 62 from a high-purity oxygen gas 61 that is raw gas. Note that the ozone apparatus instruction and status display unit 16 is configured to issue an instruction of control contents for the control circuit unit 14 and display and monitor a control state.

The application apparatus 200 primarily includes an ozone gas processing reactor 21, an ozone concentration detector 81, a sensor 82, and an ozone processing substance storage unit 22.

The ozone gas processing reactor 21 receives the ozone gas 62 from the ozone generation apparatus 100 and performs water purification processing with ozone on to-be-processed water that is the pre-ozone processing substance 91 using the ozone gas 62 to obtain the post-ozone processing substance 92 (ozone-processed water). As described above, the ozone gas processing reactor 21 performs water purification processing as the ozone usage processing.

The post-ozone processing substance 92 is temporarily stored in the ozone processing substance storage unit 22 and finally output as activated carbon processed water 93. The ozone concentration detector 81 detects a concentration of the ozone gas 62, and the sensor 82 detects a processing state of the post-ozone processing substance 92.

In order to obtain results shown in FIG. 2, a volume of a processing tank of the ozone gas processing reactor 21 is set such that an ozone contact time (ozone residence time) during which to-be-processed water that is the pre-ozone processing substance 91 and ozone are in contact with each other in the processing tank can be kept at 10 minutes under a condition that ozone is injected into the to-be-processed water at a constant rate of 3 mg/L. FIG. 2 shows results of comparison between concentration of ozone (characteristic c1000, characteristic c2000) injected from a conventional ozone generation apparatus and the ozone generation apparatus 100 according to the first embodiment and a water purification capacity of ozone (characteristic w1000, characteristic w2000) according to the concentration of ozone under the above settings.

In FIG. 2, a horizontal axis represents an injection flow rate (L/min) of ozone gas supplied from the ozone generation apparatus, and a vertical axis represents a water processing capacity by ozone gas ($m^3$/day) performed in the processing tank of the ozone gas processing reactor 21 and the concentration of injected ozone ($g/m^3$).

The injected-ozone concentration characteristic c1000 represents an injected-ozone concentration characteristic with respect to an ozone gas flow rate in the conventional ozone generation apparatus, and the injected-ozone concentration characteristic c2000 represents an injected-ozone concentration characteristic with respect to an ozone gas flow rate in the ozone generation apparatus 100 according to the present embodiment.

Further, the water purification capacity characteristic w1000 represents a water purification capacity characteristic of the conventional application apparatus with respect to ozone gas (ozone gas flow rate) supplied from the conventional ozone generation apparatus, and the water purification capacity characteristic w2000 represents a water purification capacity characteristic of the application apparatus 200 with respect to ozone gas (ozone gas flow rate) supplied from the nitrogen-free ozone generation apparatus 100.

As described above, FIG. 2 is a graph showing the water purification capacity characteristics with respect to the gas flow rate of ozone gas injected from the ozone generator to be supplied to the application apparatus.

In FIG. 2, the injected-ozone concentration characteristic c1000 represents an ozone injection concentration in the conventional ozone generation apparatus. In the conventional ozone generation apparatus, the ozone concentration usually tends to decrease from 180 g/m³ to 120 g/m³ in a manner that depends on the flow rate of injected ozone gas.

On the other hand, the ozone generation apparatus 100 according to the present embodiment can supply ozone gas with an ozone injection concentration of about 400 g/m³ in a low flow rate range and about 200 g/m³ in a large flow rate range (a gas flow rate of about 65 SLM (Standard Liter/Min)) with respect to the flow rate of injected ozone gas. When the ozone gas processing reactor 21 is compared with a conventional reactor under the same design conditions, the water purification capacity characteristic can be increased to the water purification capacity characteristic w2000 compared with the water purification capacity characteristic w1000.

That is, when the water purification capacities with ozone gas are compared under a certain condition, in the ozone generation apparatus 100 according to the present embodiment, it is possible to reduce the flow rate of ozone gas and reduce the amount of power required by the ozone generator 11. Furthermore, when the volume of the processing tank is designed such that an ozone time during which the ozone gas is kept in the ozone gas processing reactor 21 is fixed to a constant value (for example, 10 minutes), the volume of the processing tank can be reduced as the injection flow rate of ozone gas decreases.

In FIG. 2, as an example, the water purification capacity is set equal to 3000 m³/day, and a conventional ozone generator requires an ozone gas flow rate of 48 L/min at a PA point. In contrast, when the ozone generation apparatus 100 (ozone generator 11) according to the present embodiment is used, the ozone generation apparatus 100 is higher in ozone generation efficiency than the conventional ozone generator, so that the ozone gas flow rate is 21 L/min at a PB point that is about 44% of the conventional ozone gas flow rate, and accordingly, the power supplied to the ozone generator 11 can be reduced. Furthermore, as described above, with the purification capacity constant, when the injection flow rate of ozone gas decreases, the volume of the processing tank in the ozone gas processing reactor 21 of the application apparatus 200 can be reduced accordingly.

As described above, the ozone generation apparatus 100 can make the injected-ozone concentration characteristic c2000 higher than the injected-ozone concentration characteristic c1000 of the conventional ozone generation apparatus, thereby making it possible to reduce the power consumption of the ozone generation apparatus 100 and reduce the volume of the processing tank of the ozone gas processing reactor 21 of the application apparatus 200.

Ozone Generator 11

FIG. 3 to FIG. 5 show details of configurations of the inverter power source apparatus 120 and the load-resonant high-frequency step-up transformer 13 in the ozone generator 11 made small in size of the ozone generation apparatus 100.

The ozone generator 11 serves as a nitrogen-free ozone generator capable of generating, on condition that a discharge surface material suitable for ozone generation mechanism is used, high-concentration ozone gas even when oxygen gas containing no nitrogen gas is used as raw gas. Further, a discharge space in which dielectric barrier discharge occurs is reduced in gap to a gap length of not more than 0.4 mm in order to allow high electric field discharge, and a water cooling mechanism for cooling the discharge surface (not shown in FIG. 4) is installed, thereby making it possible to increase the generation amount of ozone and provide a high-concentration ozone generator capable of generating ozone with high efficiency. Therefore, as compared with the conventional ozone generator (cylindrical ozone generator), as described above, this ozone generator 11 allows short gap discharge and has a multilayer structure of flat plate cells having an improved cell water cooling structure, so as to be a small-scale ozone generator that is reduced in volume to about one third and is reduced in amount of raw gas supplied to the generator and amount of discharge power injected into the generator to about one half to one third with the concentration of extracted ozone increased about twice to three times.

Further, for the inverter power source apparatus 120, it is possible to increase an operating frequency to about five times (ten and several kHz, at least 10 kHz) higher than an operating frequency of about several kHz of a power supply source of the conventional ozone generator to reduce the voltage applied to the ozone generator 11, and reduce a magnetic flux density of a transformer core 131 of the load-resonant high-frequency step-up transformer 13 provided in an output unit of the inverter power source apparatus 120 to reduce a cross-sectional area of the transformer core 131, thereby making it possible to implement the load-resonant high-frequency step-up transformer 13 smaller in configuration than a transformer of the conventional ozone generator.

The configuration of the load-resonant high-frequency step-up transformer 13 is as shown in FIG. 4 and FIG. 5. In the load-resonant high-frequency step-up transformer 13, in order to step up the high-frequency voltage 71 (supply high-frequency voltage) to obtain a stepped-up high-frequency voltage (high-frequency high voltage) 72, the transformer core 131 serves as a transformer magnetic body component (magnetic core) made of an amorphous magnetic material or ferrite core magnetic material that has an effect of reducing high-frequency eddy current loss.

As shown in FIG. 4, in the magnetic core, a magnetic path length is formed by interposing a transformer gap spacer 133 between a pair of the transformer cores 131 having an E-shaped cross section. On the other hand, as shown in FIG. 5, the transformer molded coil 132 serves as an integrated high-frequency transformer molded coil formed by winding a secondary winding serving as a secondary coil on a primary winding (v1) serving as a primary coil, fastening the coils together with mold resin, and filling a space between the coils with insulation resin to prevent high-frequency discharge from occurring due to a high-frequency voltage between the coils. The high-frequency transformer molded coil 132 is installed inside the magnetic path length formed by the pair of transformer cores 131 shown in FIG. 4 to form a high-frequency step-up transformer body. That is, the transformer body is formed of a combination structure of the transformer core 131, the transformer molded coil 132, and the transformer gap spacer 133.

Furthermore, in the transformer body, a load capacity C0 of the ozone generator 11 and an excitation inductance Lb of the high-frequency step-up transformer body itself are caused to resonate at a high-frequency operating frequency f controlled by the converter and inverter unit 12, thereby enabling the transformer body to improve a power factor of a load. As described above, making the load-resonant high-frequency step-up transformer 13 multifunctional makes it possible to implement a resonance function and a function of increasing a frequency and voltage only with the load-resonant high-frequency step-up transformer 13 having a very small configuration without a separate resonance reactor.

The transformer gap spacer 133 is interposed between the pair of transformer cores 131 to make the excitation inductance Lb of such a multifunctional load-resonant high-frequency step-up transformer 13 smaller than an excitation inductance that is commercially available and only has a typical step-up transformer function, so as to cause the excitation inductance Lb to resonate with the load. A pair of transformer holding plates 134 are provided to support and fix the transformer core 131 and the transformer molded coil 132 from both sides in a left-right direction in FIG. 4, and the pair of transformer holding plates 134 are fixed by bolts to allow the transformer core 131 and the transformer molded coil 132 to be stably fixed inside the pair of transformer holding plates 134, 134.

Furthermore, transformer cooling holes 136 for air-cooling a loss caused by heat generated in the transformer body are provided on both sides in a vertical direction in FIG. 4, and air 69 for cooling is caused to flow around the transformer body to cool the heat generated in the transformer body. The air 69 is sucked through slits provided in unit surfaces (not shown) constituting a metal case of the ozone generation apparatus 100 and is caused to flow through the transformer cooling holes 136 and discharged by a fan 137 to air-cool the transformer body (the transformer core 131, the transformer molded coil 132, and the transformer gap spacer 133) itself.

Since the load-resonant high-frequency step-up transformer 13 is provided with the transformer gap spacer 133, some magnetic flux, that is, leakage magnetic flux, leaks in a space formed by the transformer gap spacer 133. When this leakage magnetic flux is interlinked with the case of the ozone generation apparatus 100, an eddy current flows in the case 100 to cause case heat generation. In order to prevent such case heat generation, the transformer cooling holes 136 are provided while the transformer core 131 is surrounded by a conductor and magnetic shield cover 135 made of metal in the vertical direction in FIG. 4.

Next, a description will be given of an operation of the ozone gas usage system including the ozone generation apparatus 100 and the application apparatus 200 with reference to FIG. 1. In the ozone generation apparatus 100, a commercially available oxygen gas cylinder is generally used as a supply source of raw gas. However, it is difficult to replace such a commercially available oxygen gas cylinder in a case of a processing apparatus (application apparatus) that uses ozone gas and is located in a remote area or remote island or a case where ozone gas is used in water processing on water and sewage in a large passenger ship or ballast water processing in a container ship or a crude oil tanker.

For this reason, in this example, as a description has been given of the ozone generation apparatus 100 serving as a nitrogen-free ozone generation apparatus, the raw gas purification apparatus 300 serving as a supply source of raw gas includes a combination of a compact oxygen supply source (oxygen production apparatus) and an oxygen purifier that removes nitrogen from oxygen gas as will be described later.

Examples of such a compact oxygen supply source include a pressure swing adsorption (PSA) system that concentrates oxygen gas from air and a small-scale oxygen generator that decomposes seawater or river water to extract oxygen gas. Examples of such an oxygen purifier that increases purity by removing nitrogen and the like in the oxygen source include a small-scale catalytic room temperature adsorption-type generation apparatus. The ozone generation apparatus 100 sets an ozone gas discharge pressure equal to or greater than 0.2 MPa and generates ozone having a high concentration of at least 200 g/m$^3$ under the pressure environment of at least 0.2 MPa.

As the raw gas purification apparatus 300, a structure where the oxygen supply source (oxygen production apparatus) and the oxygen gas purifier that removes the amount of nitrogen in oxygen gas has been given above, but even with only the oxygen supply source (oxygen production apparatus), the ozone generation apparatus 100 can generate required ozone gas.

Further, as the power supply apparatus 400 of the ozone generation apparatus 100, a commercial AC power supply is generally used. It is necessary, however, to consider a case of a processing apparatus (application apparatus) that uses ozone gas and is located in a remote area or remote island or a case where the ozone gas is used in water processing on water and sewage in a large passenger ship or ballast water processing in a container ship or a crude oil tanker.

In this case, as the power supply apparatus 400, a configuration is conceivable where power supply from a small-scale renewable energy source (renewable energy power generation) is used, the small-scale renewable energy source being based on solar power, wind power, geothermal power, hydraulic power, wave power, or biomass power generation in a small-scale power source apparatus that generates at least several hundred watts of power. When the power supply apparatus 400 includes a renewable energy source, the application apparatus 200 that performs small-scale water processing using ozone gas can be easily put into operation in any place such as a remote area, a remote island, or a ship, which allows effective uses. Further, with the ozone generation apparatus 100, it is possible to implement a small-scale ozone gas usage system that can reduce emission of NOx gas that is high in load on the environment. Further, the use of renewable energy power generation as the power supply apparatus 400 allows effective uses of energy in terms of local production and consumption, and the use of the application apparatus that performs ozone usage processing such as contaminated water processing, red tide processing, and sterilization processing allows the ozone gas usage system according to the first embodiment to be used as an environment improvement system suitable for each region.

To make the ozone generation apparatus 100 small in size, a material of the discharge surface suitable for ozone generation is selected, and, in the ozone generator 11, the gap length of the discharge space is made equal to or less than 0.2 mm to increase the ozone generation amount (generation efficiency), electrodes having a cooling function using water (not shown) are formed thin, and thin discharge cells including the electrodes and dielectrics are stacked on each other, thereby allowing nitrogen-free ozone generation to be achieved by a very compact apparatus configuration.

Further, the converter and inverter unit 12 of the inverter power source apparatus 120 generates the high-frequency voltage 71 resulting from increasing the frequency of power supply from the power supply apparatus 400 to several ten kHz, and the load-resonant high-frequency step-up transformer 13 shown in FIG. 3 applies, to the ozone generator 11, the stepped-up high-frequency voltage 72 that is stepped up by the load-resonant high-frequency step-up transformer 13 and high-frequency high voltage.

Applying the stepped-up high-frequency voltage 72 having a high frequency of about several ten kHz makes it possible to reduce a required voltage value Vd of the high-frequency voltage 71 output from the inverter power source apparatus 120 for allowing predetermined discharge power Wd to be input to the ozone generator 11, and increasing a frequency of the voltage supplied to the load-resonant high-frequency step-up transformer 13 to a higher frequency f makes it possible to reduce the magnetic flux density in the transformer core 131 in proportion to the frequency, which makes it possible to reduce the cross-sectional area of the transformer core 131 and in turn makes it possible to reduce the volume of the transformer body itself.

Further, since the load of the ozone generator 11 is composed of an ozone generator cell having a short gap discharge space, the load becomes very low in load power factor (about several ten percent or less) because the load impedance occupies most of the load capacity. For this reason, since a load capacity (kVA) becomes large compared with active power to be input, it is necessary to increase the size of the transformer body itself in accordance with the load capacity. In order to prevent an increase in size of the transformer body in accordance with the load capacity, the load-resonant high-frequency step-up transformer 13 is made multifunctional to include a function of causing the load capacity C0 of the ozone generator 11 and the excitation inductance Lb of the load-resonant high-frequency step-up transformer 13 itself to resonate.

Making the load-resonant high-frequency step-up transformer 13 multifunctional allows the transformer body to recover reactive power of the load, and the transformer body itself can be manufactured so as to include a power transmission function for almost only the active power, allowing this multifunctional load-resonant high-frequency step-up transformer 13 to have a very compact structure.

As a measure against an increase in load capacity (kVA) of the ozone generator 11 compared with the generated input power because the load power factor is very low (about several ten percent or less), a method in which a resonance reactor is provided on the load side of the transformer to cause the resonance reactor and the load capacity C0 of the ozone generator 11 to resonate is conventionally employed. It is, however, required that two transformers be provided because the resonance reactor itself is large in size and is provided in addition to the transformer.

However, in the ozone generation apparatus 100 according to the present embodiment, the load-resonant high-frequency step-up transformer 13 is made multifunctional as described above, so that the function of the transformer on the load side and the resonance function are implemented only by the load-resonant high-frequency step-up transformer 13, thereby allowing the load-resonant high-frequency step-up transformer 13 having a very small structure to be made and in turn making it possible to implement the small-scale ozone generator 11.

The load-resonant high-frequency step-up transformer 13 made compact has another problem to be solved. That is, at the high-frequency operating frequency of several ten kHz, the transformer gap spacer 133 needs to be provided in a magnetic flux formation path of the transformer core 131 in order to obtain the excitation inductance Lb of the transformer itself that resonates with the load capacity C0, causing some of the magnetic flux to leak in the space formed by the transformer gap spacer 133.

When this leakage magnetic flux is interlinked with the case of the ozone generation apparatus 100, eddy current heat generation (eddy current loss) occurs in the case 100. Therefore, when a space having a width of at least about 40 mm is provided around the load-resonant high-frequency step-up transformer 13 installed in order to suppress this eddy current heat generation to a small extent, the leakage magnetic flux that is interlinked with the case is weakened. It is, however, required that the case of the ozone generation apparatus 100 have space having a width of at least about 40 mm around the transformer 13, thereby increasing the size of the case of the ozone generation apparatus 100 itself.

In order to solve this problem, the load-resonant high-frequency step-up transformer 13 has a structure where the transformer core 131 is covered with the conductor and magnetic shield cover 135 made of metal very low in resistivity such as aluminum or copper. Accordingly, the presence of the conductor and magnetic shield cover 135 causes the leakage magnetic flux from the transformer gap spacer 133 to be interlinked with the conductor and magnetic shield cover 135 and causes eddy current loss generated in the conductor and magnetic shield cover 135 to be suppressed to a very small extent, thereby weakening magnetic flux leaking to the outside from the conductor and magnetic shield cover 135. The conductor and magnetic shield cover 135 thus provided can shield heat generation and magnetism due to the leakage magnetic flux, so that the ozone generation apparatus 100 (ozone generator 11) itself can be made small in size.

Next, a description will be given of the internal configuration of the load-resonant high-frequency step-up transformer 13 that has multiple functions and is successfully made small in size with reference to FIG. 4 and FIG. 5.

The load-resonant high-frequency step-up transformer 13 has a structure where the high-frequency voltage 71 is supplied from the inverter power source apparatus 120 to v1-v2 of a primary coil of the transformer molded coil 132, and the stepped-up high-frequency voltage 72 having the operating frequency f stepped up in accordance with the load of the ozone generator 11 is output to HV-LV of a secondary coil.

Accordingly, as shown in FIG. 4 and FIG. 5, in the load-resonant high-frequency step-up transformer 13, the two E-shaped magnetic transformer cores 131, the transformer gap spacer 133, and the transformer molded coil 132 for high-frequency use resulting from winding the primary coil and the secondary coil of the transformer together constitute the transformer body.

Specifically, between the pair of transformer cores 131, 131, the transformer gap spacer 133 is interposed between and in intimate contact with upper end portions 131$t$, 131$t$, center ends 131$c$, 131$c$, and lower end portions 131$b$, 131$b$, and the primary coil and the secondary coil are wound around the center ends 131$c$ in a coil forming space formed between the center ends 131$c$ and the upper ends 131$t$ and between the center ends 131$c$ and the lower ends 131$b$ to form the transformer body including the transformer cores 131, the transformer molded coil 132, and the transformer gap spacer 133. That is, the transformer body is formed by fitting the transformer molded coil 132 into the pair of E-shaped transformer cores 131.

Then, the pair of transformer holding plates 134 are provided to hold side surfaces of the pair of transformer cores 131 from both sides in the left-right direction in FIG. 4, and the pair of transformer holding plates 134, 134 are fixed with bolts (not shown). As a result, the transformer body (the transformer cores 131, the transformer molded coil 132, and the transformer gap spacer 133) is fixed between the pair of transformer holding plates 134, 134.

Furthermore, the conductor and magnetic shield cover 135 that prevents the occurrence of an eddy current heat generation phenomenon due to the leakage magnetic flux from the transformer body while providing the transformer cooling holes 136 between the conductor and magnetic shield cover 135 and the transformer body are fixed to the transformer holding plates 134 from both sides in the vertical direction in FIG. 4.

The load-resonant high-frequency step-up transformer 13 is configured to cause the load capacity C0 of the ozone generator 11 and the excitation inductance Lb of the transformer body to resonate at the high-frequency operating frequency f to improve the power factor of the load that is low in power factor. Accordingly, the transformer gap spacer 133 is provided to adjust the excitation inductance Lb of the transformer body itself corresponding to the load capacity C0 to a resonance inductance value, and the transformer gap spacer 133 is adjusted in thickness to a range of about 1 mm to 5 mm such that the excitation inductance Lb is equal to the resonance inductance value with respect to the load capacity C0.

This brings about a magnetic flux leakage phenomenon in which some of the magnetic flux in the closed loop of the transformer core 131 leaks around the transformer gap spacer 133 constituting a part of the transformer body. Due to the eddy current heat generation phenomenon due to this magnetic flux leakage, when metallic unit surfaces that constitute a housing case of the nitrogen-free ozone generation apparatus 100 are located within 40 mm from the transformer body, the housing case itself is heated by Joule heat generated by the eddy current that occurs in the unit surfaces by this leakage magnetic flux.

As a measure to prevent heat generation in the unit surfaces of the housing case of the ozone generation apparatus 100, the metallic conductor and magnetic shield cover 135 having conductivity is provided above and below the transformer gap spacer 133 shown in FIG. 4 constituting the transformer body.

As described above, since the conductor and magnetic shield cover 135 is provided around the transformer molded coil 132, the leakage magnetic flux leaking from a portion of the transformer core 131 where the transformer gap spacer 133 is formed is interlinked with the conductor and magnetic shield cover 135. Therefore, although the eddy current flows in the conductor and magnetic shield cover 135, when the conductor and magnetic shield cover 135 made of a material that is very high in conductivity such as aluminum or copper, Joule heat generated by this eddy current becomes extremely small, and heat generated in the conductor and magnetic shield cover 135 itself can also be extremely reduced. Furthermore, even when the metallic unit surfaces constituting the housing case of the ozone generation apparatus 100 are brought close to the transformer body with a gap of several millimeters, the presence of the conductor and magnetic shield cover 135 prevents the unit surfaces from generating heat.

That is, causing the magnetic flux leaking from the transformer body to flow as an eddy current in the conductor and magnetic shield cover 135 makes it possible to extremely lower the density of magnetic flux leaking through the conductor and magnetic shield cover 135. As a result, the conductor and magnetic shield cover 135 can not only indirectly prevent heat generation due to the leakage magnetic flux phenomenon but also exhibit a certain degree of magnetic shielding effect.

Furthermore, about several percent of the power transmitted to the load generates heat as copper loss of the transformer molded coil 132 and iron loss of the transformer core 131, and thus the load-resonant high-frequency step-up transformer 13 itself is heated to a high temperature due to the heat capacity of the transformer body when the transformer body itself kept uncooled. This makes it necessary to cause air to flow around the transformer body at a predetermined flow rate to cool several percent of the amount of heat generated in the transformer body itself. For this reason, the transformer cooling holes 136 are provided between the conductor and magnetic shield cover 135 and the transformer body to allow the cooling air 69 to flow through the transformer cooling holes 136, allowing the transformer body to be appropriately air-cooled.

In the structure shown in FIG. 4, the conductor and magnetic shield cover 135 is provided with notches where the transformer cooling holes 136 are formed, or alternatively, a cooling structure where notches or the like are provided in surfaces of the transformer holding plates 134 rather than the conductor and magnetic shield cover 135 to form spaces corresponding to the transformer cooling holes 136 may be provided. Further, in the present embodiment, the load-resonant high-frequency step-up transformer 13 that is air-cooled, small in size, and has multiple functions has been given, but a substantially equivalent small-scale load-resonant high-frequency step-up transformer 13 can be implemented even with a configuration where the surfaces of the transformer holding plates 134 are cooled by flowing water or coolant, which in turn makes it possible to implement the compact ozone generator 11.

Further, in the load-resonant high-frequency step-up transformer 13 shown in FIG. 4 and FIG. 5, the transformer body of an outer iron core (core) type in which the primary coil and the secondary coil are wound into the transformer molded coil 132, and the transformer molded coil 132 is installed in the E-shaped transformer core 131 has been given, but a transformer of an inner iron core (core) type in which a molded coil of the primary coil and a molded coil of the secondary coil are separately provided, and the molded coil of the primary coil and the molded coil of the secondary coil are separately installed on U-shaped cores exhibits the same effect.

A comparison between the transformer body of the outer iron core type and the transformer body of the inner iron core type shows that the transformer body of the outer iron core type is desirable because the transformer body can be made smaller in size, and heat generated in the transformer core 131 can be easily air-cooled as described above due to a configuration where only one transformer molded coil 132 constituting a part of the transformer body is provided.

As described above, in the ozone generation apparatus 100 according to the present embodiment, the inverter power source apparatus 120 generates the high-frequency voltage 71 having a frequency of at least 10 kHz, and the load-resonant high-frequency step-up transformer 13 serving as a resonant transformer includes the transformer body (the transformer core 131, the transformer molded coil 132, and the transformer gap spacer 133) that obtains the stepped-up high-frequency voltage 72 from the high-frequency voltage 71.

Making the high-frequency voltage 71 and the stepped-up high-frequency voltage 72 higher in frequency allows both the inverter power source apparatus 120 and the load-resonant high-frequency step-up transformer 13 to be made small in size, thereby allowing the apparatus configuration of the ozone generator 11 in the ozone generation apparatus 100 to be made compact.

Furthermore, since the load-resonant high-frequency step-up transformer 13 has a larger space, the leakage magnetic flux becomes large compared with a typical transformer.

Therefore, the transformer cooling holes 136 serving as cooling spaces are provided between the transformer body and the conductor and magnetic shield cover 135, and the conductor and magnetic shield cover 135 serving as a metal cover member covering the transformer body is provided such that the eddy current heat generation phenomenon caused by the magnetic flux leaking from the transformer body outside the load-resonant high-frequency step-up transformer 13 is prevented from occurring, thereby shielding the leakage magnetic flux from the transformer.

As described above, since the load-resonant high-frequency step-up transformer 13 includes the conductor and magnetic shield cover 135, it is possible to effectively suppress the effect of the magnetic flux leakage phenomenon including eddy current heat generation on the outside even when the load-resonant high-frequency step-up transformer 13 is made small in size.

In addition, with the transformer cooling holes 136 and the conductor and magnetic shield cover 135 provided, the air 69 is caused to flow through the transformer cooling holes 136, thereby making it possible to effectively cool and remove heat generated in the transformer body itself.

A commonly used ozone generator is a cylindrical ozone generator in which raw gas such as a dry air source, a general oxygen gas source that is not high-purity oxygen, or gas resulting from adding a trace amount of nitrogen gas to oxygen gas, and dielectric barrier discharge or creeping discharge is used. Accordingly, when raw gas is a dry air source, nitrogen constitutes 75% (750000 ppm) of the raw gas, and the ozone generation amount is only about one fourth or less of the ozone generation amount made by an ozone generator that uses oxygen gas as raw gas. In such a cylindrical ozone gas generator using a dry air source as raw gas, the concentration of output ozone is low which is generally about several ten g/m$^3$ because raw gas contains a large amount of nitrogen gas, and, in order to obtain a desired ozone generation amount, not only the ozone generator is increased in size, but also the amount of power and the amount of raw gas supplied to the ozone generator tends to increase, which in turn makes the apparatus configuration of the application apparatus that performs ozone usage processing using ozone gas large.

Further, when the raw gas is a general oxygen gas source that is not high-purity oxygen, nitrogen gas constitutes a small percentage, usually 0.1% (1000 ppm) to 1% (10000 ppm), of the raw gas.

A result of our measurement test shows that, when raw gas containing oxygen gas and nitrogen gas constituting 1% of the raw gas, NOx gas of several ten to several hundred PPM is generated by dielectric barrier discharge, and high-concentration ozone is generated as a result of a chemical reaction between the trace amount of NOx gas and the dielectric barrier discharge. In other words, when high-concentration ozone is generated by the ozone generator using raw gas containing oxygen gas and nitrogen gas constituting 1% of the raw gas, it turned out that, for example, NOx gas of several ten to several hundred PPM is also generated in the high-concentration ozone gas of 150 g/m$^3$ (70000 PPM) in a manner that depends on the electric field strength of discharge. Accordingly, when high-concentration ozone gas is generated from raw gas containing oxygen gas and nitrogen gas constituting 1% of the raw gas, ozone gas containing NOx gas, which is said to be inevitably high in load on the environment, having a concentration of several ten to several hundred PPM is output.

The application apparatus using such ozone gas can effectively perform ozone usage processing, and the processing effect is sufficient, but the ozone generation apparatus also generates gas having an NOx concentration of several hundred PPM, and this by-product NOx gas is regarded as a substance that is high in load on the environment and is difficult to be decomposed, and therefore the NOx gas is mixed into the post-ozone processing substance or discharged into the atmosphere as exhaust ozone. Further, the gas thus generated having an NOx concentration of several ten to several hundred PPM is bonded with water to form nitric acid ($HNO_3$). It is conceivable that this nitric acid ($HNO_3$) accelerates corrosion of metal to shorten the life of the application apparatus or raises a hygiene problem of processed water when the ozone usage processing is water cleaning processing.

A first prerequisite for achieving nitrogen-free ozone generation that suppresses the generation of NOx and is thus low in load on the environment is to use, as raw gas, high-purity oxygen gas containing no nitrogen gas.

A commonly used ozone generation apparatus requires a prerequisite that at least about 1% (10000 PPM) nitrogen gas is contained, and fails to generate high-concentration ozone gas from oxygen gas contains no nitrogen gas. Accordingly, it is not an ozone generator that reliably generates a predetermined amount of ozone without generating NOx.

Therefore, the ozone generation apparatus 100 used in the present embodiment can generate ozone gas, specifically high-concentration ozone gas, from raw gas containing no nitrogen gas by using a specific photocatalyst material as the discharge surface material in the ozone generator, and the ozone generation apparatus 100 is thus indispensable for implementing the ozone gas usage system using ozone gas that is low in load on the environment.

Furthermore, ozone gas that is commonly used and supplied to the application apparatus that performs water purification processing as ozone usage processing has a supply pressure of less than 0.15 MPa and a concentration of several ten g/m$^3$ to less than 180 g/m$^3$, and it is thus difficult to build the application apparatus that is small in size (see FIG. 2).

Application Apparatus 200

Figure 6:
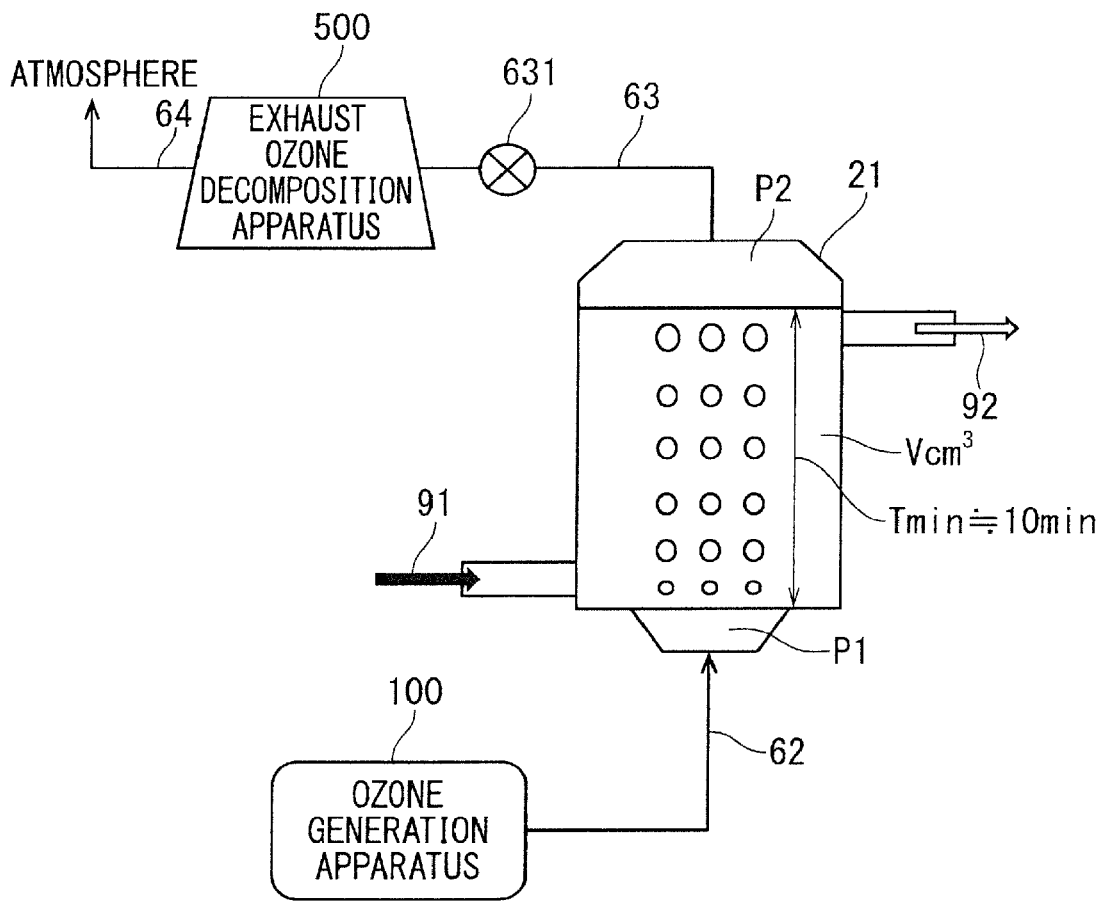
FIG. 6 is an explanatory diagram showing details of a configuration of an ozone gas processing reactor in an application apparatus shown in FIG. 1.

FIG. 6 is an explanatory diagram showing details of a configuration of the ozone gas processing reactor 21 in the application apparatus 200 shown in FIG. 1. The ozone gas processing reactor 21 performs water cleaning processing using ozone gas as ozone usage processing.

To-be-processed water that is the pre-ozone processing substance 91 is injected through a lower portion of the ozone gas processing reactor 21, and after the water cleaning processing is performed on the to-be-processed water, the ozone-processed water subjected to the water cleaning processing is discharged from an upper portion as the post-ozone processing substance 92.

An ozone space in which ozone gas is present at a constant pressure P1 is provided at a bottom of the ozone gas processing reactor 21, and ozone gas generated by the ozone generation apparatus 100 is supplied to the ozone space. Fine holes provided through the bottom of the ozone gas processing reactor 21 serve as gas diffusing pipes, ozone gas thus supplied passes through the gas diffusing pipes into water portion in the ozone gas processing reactor 21 as an infinite number of bubbles, and the water purification processing (processing including ozone oxidation chemical processing and ozone sterilization processing) is performed by causing the ozone gas in the bubbles to come into contact with the to-be-processed water to purify the to-be-processed water that is the pre-ozone processing substance 91 to obtain the post-ozone processing substance 92.

Normally, a contact time Tmin (minute) of about 10 minutes between the to-be-processed water and the ozone gas is practically sufficient to accelerate oxidation reaction between the surrounding water and the ozone in the bubbles, and thus the water purification processing capacity of the ozone gas processing reactor 21 is determined by the injection amount (mg/L) of ozone supplied to the to-be-processed water, an ozone gas flow rate Q, and a volume Vcm$^3$ of the ozone gas processing reactor 21.

In the conventional ozone generator for water purification processing, the supply pressure at which ozone is supplied to the ozone gas processing reactor 21 is less than 0.15 MPa, and as indicated by the injected-ozone concentration characteristic c1000 in FIG. 2, the ozone concentration is in a range of 120 g/m$^3$ to less than 180 g/m$^3$. On the other hand, in the ozone generation apparatus 100 according to the present embodiment, the ozone generator 11 is used, thereby allowing the high-concentration ozone gas having an ozone concentration of 200 g/m$^3$ to 400 g/m$^3$ (see the injected-ozone concentration characteristic c2000) to be supplied to the ozone gas processing reactor 21.

This in turn brings about an advantage that the ozone gas flow rate Q can be significantly reduced (for example, from the PA point to the PB point in FIG. 2) when supplying a predetermined amount of ozone gas. Thus, with the ozone gas flow rate Q reduced, when the ozone residence time of 10 minutes is kept unchanged, the formation height of the ozone gas processing reactor 21 (of the processing tank in the ozone gas processing reactor 21) can be made lower than the conventional configuration, and the cross-sectional area can also be reduced, which in turn brings about an advantage that the volume of the processing tank can be reduced to make the ozone gas processing reactor 21 more compact and the water purification processing capacity can be increased.

Further, assuming that the supply ozone gas pressure P1 can be increased, when an exhaust pressure P2 of the ozone gas processing reactor 21 is increased by a valve 631, bubbles in the to-be-processed water can be made smaller, the contact reaction between the ozone gas and the to-be-processed water is further increased, the processing capacity of the ozone gas processing reactor 21 is increased, and it is thus highly likely that the effect of increasing the capacity compared with the water purification capacity characteristic w2000 shown in FIG. 2 is brought about. Therefore, it is desirable to set the pressure environment under which the ozone gas pressure P1 is at least 0.2 MPa.

As described above, since the application apparatus 200 constituting a part of the ozone gas usage system according to the present embodiment receives ozone gas having a relatively high ozone concentration of at least 200 g/m$^3$, it is possible to reduce the ozone gas supply amount itself to make the apparatus configuration compact.

Furthermore, since the application apparatus 200 receives ozone gas from the ozone generation apparatus 100 under an environment of the ozone gas pressure P1 of at least 0.2 MPa, it is possible to increase the water purification capacity of the water purification processing that is ozone usage processing.

Raw Gas Purification Apparatus 300

Figure 7:
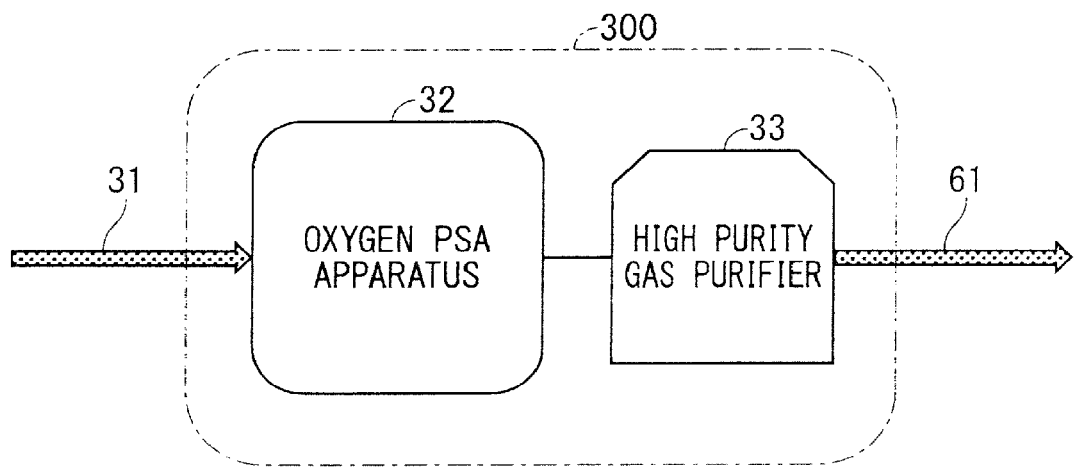
FIG. 7 is an explanatory diagram showing details of a raw gas purification apparatus shown in FIG. 1.

FIG. 7 is an explanatory diagram showing details of the raw gas purification apparatus 300 to be used in combination with the ozone generation apparatus 100. Normally, a commercially available oxygen cylinder is used as the raw gas source. However, in order to make the ozone gas usage system applicable to any field, it is desirable to employ a configuration where oxygen gas is produced from air in the atmosphere or water, and water or nitrogen gas is removed from the gas.

FIG. 7 shows a configuration where the raw gas purification apparatus 300 serving as the raw gas supply apparatus includes a combination of an oxygen PSA apparatus 32 configured to compress the air in the atmosphere to concentrate oxygen gas and a high-purity gas purifier 33 (oxygen purifier) configured to convert the concentrated oxygen gas obtained from the oxygen PSA apparatus 32 into high-purity oxygen gas. It is desirable that the oxygen PSA apparatus 32 and the high-purity gas purifier 33 each have a capacity as small as possible.

The oxygen PSA apparatus 32 serves as an oxygen extraction apparatus that extracts oxygen gas from the air, and the high-purity gas purifier 33 serves as an oxygen gas purifier that further removes, from the oxygen gas extracted by the oxygen PSA apparatus 32, a trace amount of impurities other than the oxygen gas to produce high-purity oxygen gas.

Herein, the oxygen PSA apparatus 32 has been given as the oxygen extraction apparatus, but rather than the oxygen PSA apparatus 32, an oxygen gas production apparatus that extracts oxygen gas from water by electrolysis or catalytic action. That is, the oxygen gas production apparatus serves as the oxygen extraction apparatus that extracts oxygen gas from water.

As described above, since the raw gas purification apparatus 300 serving as the raw gas supply apparatus used in the ozone gas usage system according to the present embodiment includes the combination of the oxygen PSA apparatus 32 and the high-purity gas purifier 33, the raw gas purification apparatus 300 is applicable to any field.

Assuming that the small-scale ozone generation apparatus 100 can efficiently generate ozone (high-concentration ozone) gas from raw gas supplied at a low flow rate, the application apparatus that uses the ozone gas can be made small in size, the apparatus configuration of the raw gas purification apparatus 300 that generates oxygen gas that is raw gas supplied at a low flow rate and purifies the oxygen gas can also be reduced, and the ozone gas usage system as a whole can be made small in size.

Although a description has been given of the configuration of the ozone gas usage system according to the present embodiment where, in order to use NOx-free ozone gas that is low in load on the environment, the high-purity gas purifier 33 serving as a nitrogen removal apparatus is provided in the raw gas purification apparatus 300, and the ozone generator 11 made small in size is used, the raw gas purification apparatus 300 may include only the oxygen PSA apparatus 32 and may be combined with the small-scale ozone generator 11.

Elucidation of Mechanism of High-Concentration Ozone Gas Generation

It has been obvious that a certain level of ozone concentration can be obtained with electrons during discharge since a long time ago, and various technologies have been disclosed in the prior art documents for the mechanism that can generate ozone gas having a high concentration exceeding 100 g/m$^3$ (46700 ppm), but it cannot be said that the correct pursuit of mechanism has been made.

Figure 11:
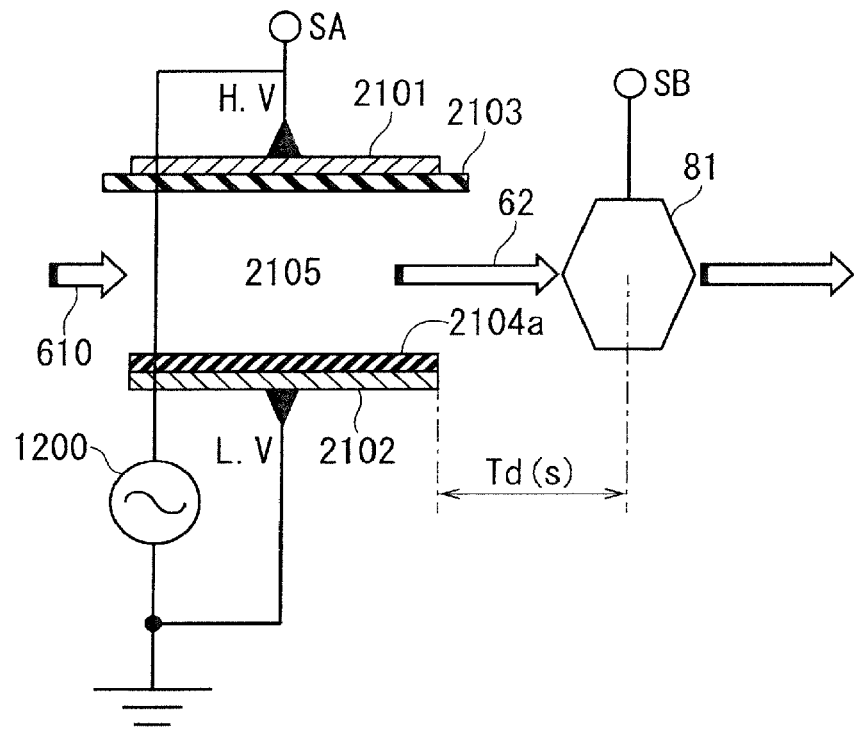
FIG. 11 is an explanatory diagram (part 1) schematically showing a test configuration of an electrode configuration of an ozone generator and an ozone concentration detector.
Figure 12:
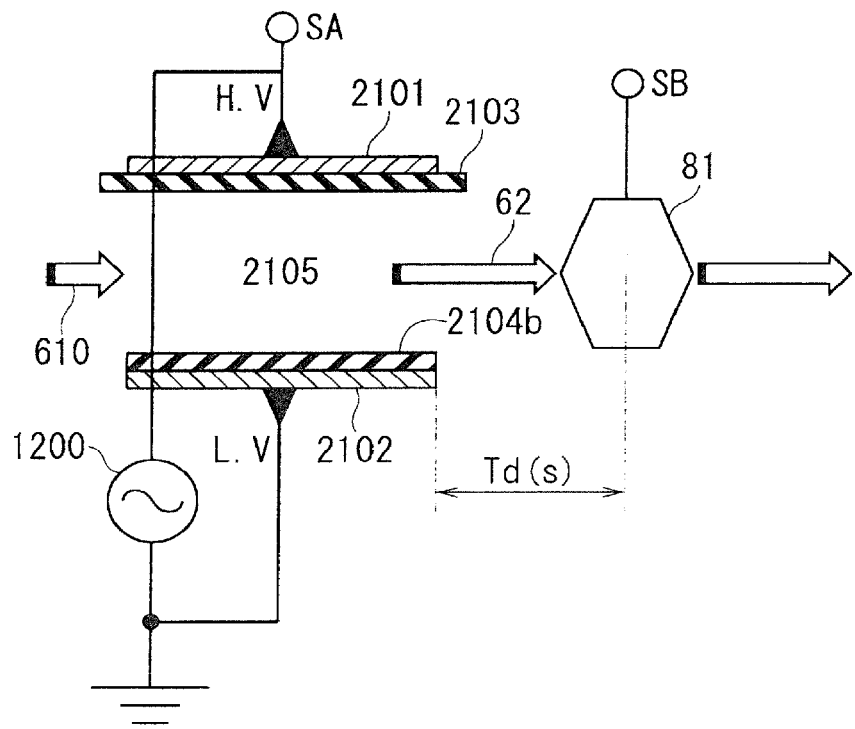
FIG. 12 is an explanatory diagram (part 2) schematically showing a test configuration of an electrode configuration of the ozone gas generator and the ozone concentration detector.
Figure 13:
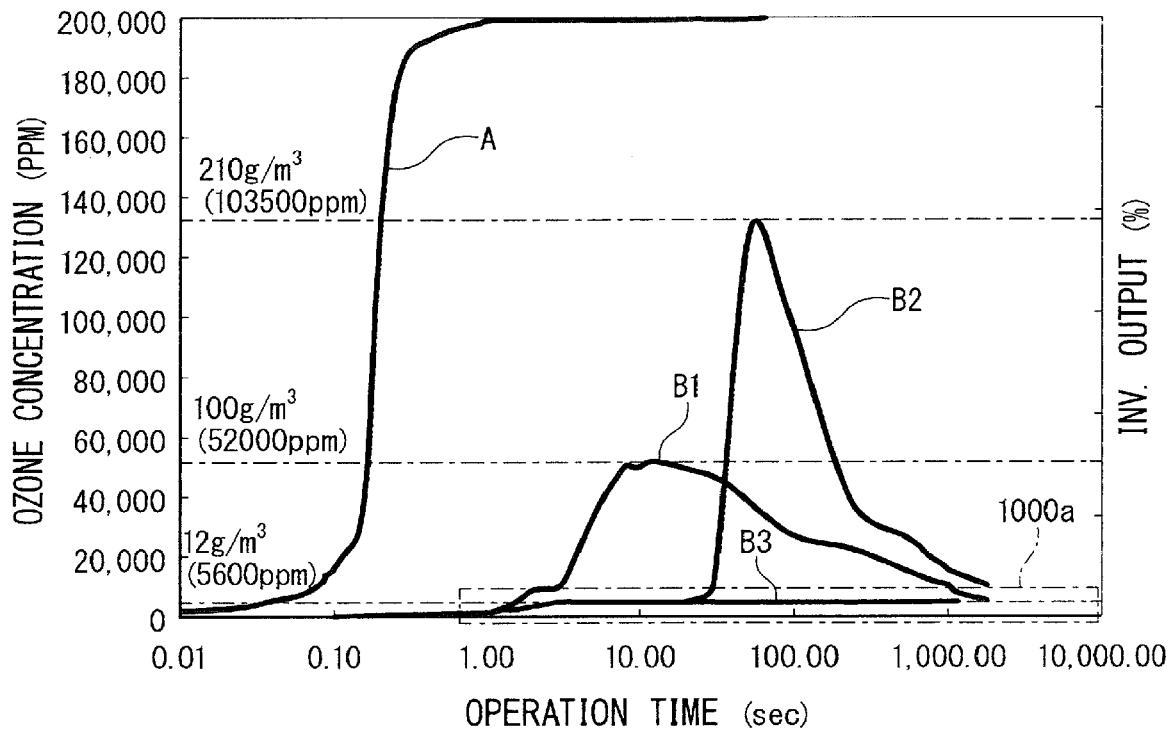
FIG. 13 is a graph showing ozone concentration generation rising characteristics in a test ozone generator I (FIG. 11) having a discharge surface material formed of a passivated insulation film.
Figure 14:
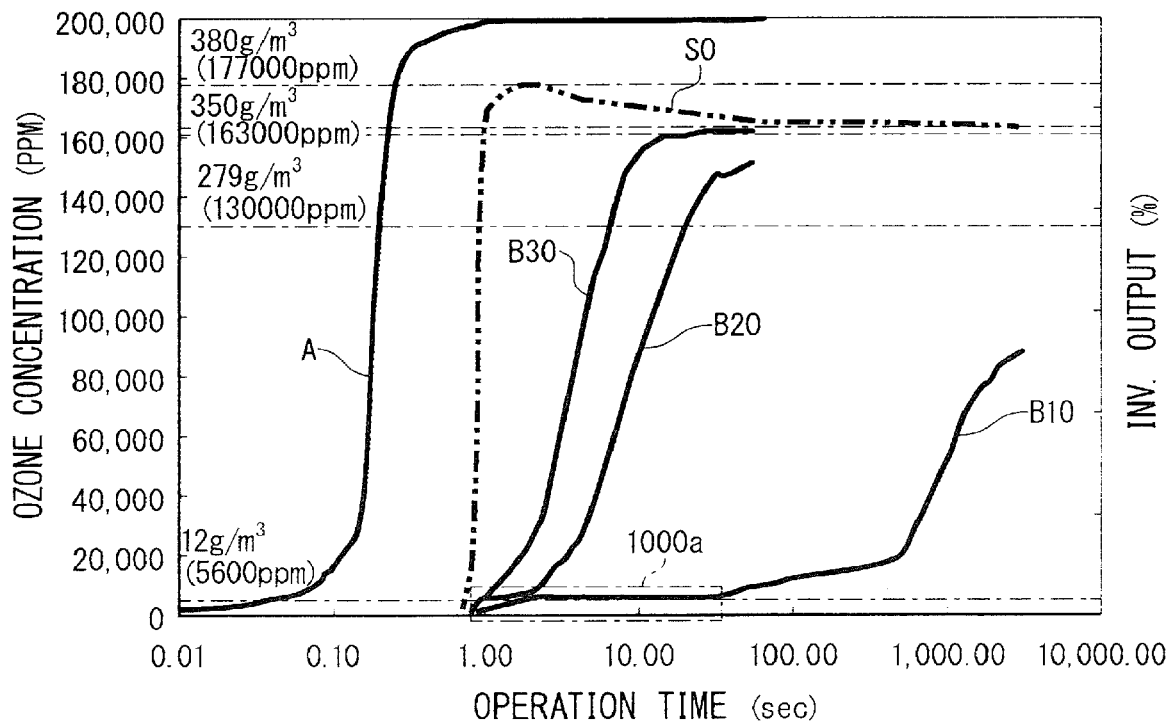
FIG. 14 is a graph showing ozone concentration generation rising characteristics of high-purity oxygen gas in a test ozone generator II (FIG. 12) having a discharge surface material formed of a photocatalyst insulation film.

Therefore, in order to elucidate the mechanism that can generate high-concentration ozone gas by discharge, in our test, a rising response of ozone concentration was measured and made clear as shown in FIG. 13 and FIG. 14, the ozone being generated in accordance with a voltage [inverter output (INV. output)] applied to electrodes based on electrodes and discharge surface material configurations (test ozone generators I and II) shown in FIG. 11 and FIG. 12 under a condition where test conditions such as a raw gas type, discharge surface state, and discharge surface material are varied. As a result, the accuracy of the contents disclosed in Patent Document 1 to Patent Document 7 was re-verified. Note that the details will be described later as an explanation of the measurement results of FIG. 13 and FIG. 14.

FIG. 11 and FIG. 12 are explanatory diagrams schematically showing a test configuration including electrodes of an ozone generator, a discharge surface material configuration, and an ozone concentration detector for elucidating a mechanism that can generate high-concentration ozone gas.

FIG. 11 shows a test configuration of an ozone generator where the discharge surface material in the generator is a passivated insulation film 2104a that is not chemically changed by discharge light or the like, and FIG. 12 shows a test configuration of an ozone generator where the discharge surface material is a photocatalyst insulation film 2104b that absorbs discharge light or the like to be activated.

Td(s) shown in FIG. 11 and FIG. 12 represents an ozone concentration detection delay time obtained from the volume of gas piping extending from the ozone generator to the ozone concentration detector 81 and the gas flow rate Q at the time of test. A rising characteristic of a high voltage detected from an output signal (high AC voltage) SA is shown as an output signal (high AC voltage) characteristic A in FIG. 13 and FIG. 14. Under a consideration of a concentration rising response B corresponding to the output signal (high AC voltage), a concentration rising response characteristic B(t-Td) resulting from subtracting the ozone concentration detection delay time Td(s) from a concentration rising response characteristic B(t) measured by the ozone concentration detector 81 represents the ozone concentration rising response characteristic of the ozone generator itself. In other words, the ozone concentration rising response characteristic B(t-Td) of the ozone generator itself in a discharge surface state with the discharge surface material configuration shown in FIG. 11 and FIG. 12, and the ozone concentration rising response characteristic B(t-Td) of the ozone generator itself depending on differences of the gas type and the discharge surface material are represented as B1, B2, B3 in FIG. 13 and B10, B20, B30 in FIG. 14.

Characteristics under the following conditions applied to the ozone generators shown in FIG. 11 and FIG. 12 are shown in FIG. 13 and FIG. 14. The ozone concentration rising characteristic B(t-Td) is plotted on a logarithmic time axis under a condition where raw gas is caused to flow at a gas flow rate of 1 L/min, a discharge output of 500 W to the ozone generator is input, and the rising response A of the output signal SA injected and the ozone concentration detection delay time Td(s) are taken into account. The ozone concentration detection delay time Td(s) from the ozone generator to the concentration detection in the ozone concentration detector 81 when the gas is caused to flow at the gas flow rate 1 L/min was 4.16 seconds.

FIG. 13 is a graph showing ozone concentration generation rising characteristics B1, B2, and B3 in the ozone generator (FIG. 11) in which the discharge surface material is the passivated insulation film 2104a.

FIG. 14 is a graph showing ozone concentration generation rising characteristics B10 and B20 when the gas type is changed in the ozone generator (FIG. 11) in which the discharge surface material is the passivated insulation film 2104a, and an ozone concentration generation rising characteristic B30 in the ozone generator (FIG. 12) in which the discharge surface material is the photocatalyst insulation film 2104b.

In the test ozone generator I, as shown in FIG. 11, an electrode and a discharge surface on a high potential side (H.V) are formed of a high potential electrode 2101 and a dielectric 2103, respectively, and an electrode and a discharge surface on a low potential side (L.V) are formed of a low potential electrode 2102 and the passivated insulation film 2104a, respectively. A discharge space 2105 is defined between the dielectric 2103 serving as the discharge surface and the passivated insulation film 2104a facing each other.

On the other hand, in the test ozone generator II, as shown in FIG. 12, an electrode and a discharge surface on the high potential side (H.V) are formed of the high potential electrode 2101 and the dielectric 2103, respectively, and an electrode and a discharge surface on the low potential side (L.V) are formed of the low potential electrode 2102 and the photocatalyst insulation film 2104b, respectively. The discharge space 2105 is defined between the dielectric 2103 serving as the discharge surface and the photocatalyst insulation film 2104b facing each other.

In each of FIG. 11 and FIG. 12 showing the configurations of the test ozone generators I, II, a high voltage AC power source 1200 applies an AC voltage to a space between the high potential electrode 2101 and the low potential electrode 2102. Therefore, when an AC voltage is applied from the high voltage AC power source 1200 to the space between the high potential electrode 2101 and the low potential electrode 1202 through the dielectric 2103, a dielectric barrier discharge is formed in the discharge space 2105. Accordingly, when raw gas 610 is supplied to the discharge space 2105, the high-concentration ozone gas 62 is generated and output to the outside.

The ozone concentration detector 81 is provided in a location away from the ozone generator by a predetermined piping length, and the ozone concentration detector 81 detects the concentration of the high-concentration ozone gas 62 generated in the ozone generator as an ozone concentration signal SB, thereby allowing the rising response B of the high-concentration ozone gas to be detected. Further, regarding the output signal (high AC voltage) SA, an AC voltage for generating ozone is detected as an output signal A. The output signal A and the ozone concentration signal SB are captured into a memory high coder capable of performing measurement at a sampling rate of millisecond order, and the concentration rising characteristic B of the generated ozone concentration signal SB with respect to the output signal A is precisely measured.

Therefore, when the concentration rising response characteristic B is analyzed with the generated ozone concentration signal SB corresponding to a step response signal A of the output signal (high AC voltage) detected from the output signal SA, it is made clear what kind of factor contributes to ozone generation, and, with a consideration of a result of concentration generation simulation and an actual measurement result, it is possible to elucidate the mechanism that can generate high-concentration ozone.

Test Result Showing Relationship Between Discharge Surface Condition and Ozone Generation with High-Purity Oxygen Gas The characteristic A shown in FIG. 13 and FIG. 14 represents a rising characteristic (%) of the applied voltage from the power source detected from the output signal SA.

The characteristic B1 shown in FIG. 13 represents an ozone concentration rising characteristic when, in the test ozone generator 1 (FIG. 11), raw gas that is high-purity oxygen gas (oxygen+0% nitrogen gas) is caused to flow through the test ozone generator on an initial discharge surface and a voltage having the rising characteristic A is applied (the initial discharge surface is a discharge surface at the time of manufacture and is a virgin discharge surface that has never been discharged).

The characteristic B2 shown in FIG. 13 represents an ozone concentration rising characteristic when, in the test ozone generator I (FIG. 11), raw gas that is high-purity oxygen gas (oxygen+0% nitrogen gas) is caused to flow through the test ozone generator I on a discharge surface after discharging with gas (oxygen+500 ppm nitrogen gas) resulting from adding a trace amount of nitrogen gas to oxygen and the voltage having the rising characteristic A is applied.

The characteristic B3 shown in FIG. 13 represents an ozone concentration rising characteristic when, in the test ozone generator I (FIG. 11), raw gas that is high-purity oxygen gas (oxygen+0% nitrogen gas) is caused to flow again through the test ozone generator I on the discharge surface after discharging with the high-purity oxygen gas (oxygen+0% nitrogen gas) for several hours and the voltage having the rising characteristic A is applied.

As described above, in the test ozone generator I in which the passivated insulation film $2104a$ is used as the discharge surface, when raw gas is high-purity oxygen gas and the voltage is applied to the generator to cause discharge, an ozone concentration of 100 $g/m^3$ to 210 $g/m^3$ may appear during a discharge period of about 1000 seconds (about 16.6 minutes), but when long-time discharge is made, the characteristics B1, B2 show a gradual decrease in concentration toward a saturated concentration value 12 $g/m^3$ of the characteristic B3. That is, the phenomenon of ozone generation of about 100 $g/m^3$ to 210 $g/m^3$ at the initial stage of discharge of the characteristics B1, B2 shows the fact that gas adsorbed on the discharge surface is released by discharge, and a trace amount of gas adsorbed on the discharge surface is mixed into raw gas that is high-purity gas to generate ozone, and it has been confirmed through a test that when the discharge is continued for at least about 1000 seconds, the adsorbed gas other than oxygen released from the discharge surface is not released any more, and the saturated concentration value is 12 $g/m^3$. That is, it can be said that the saturated concentration value of 12 $g/m^3$ indicated by the characteristic B3 is an ozone generation capacity when the discharge surface is the passivated insulation film $2104a$. It can be said that ozone generation at this concentration value of 12 $g/m^3$ corresponds to ozone generation made by an effect independent of the discharge surface, and this ozone concentration of 12 $g/m^3$ (ozone concentration rising characteristic region $1000a$) represents a maximum ozone concentration that can be generated by collision between electrons generated by the dielectric barrier discharge and oxygen gas.

Test Result Showing Relationship Between
Addition of 500 ppm of Nitrogen Gas and Ozone
Generation The characteristic B10 represents an ozone concentration rising characteristic when, in the test ozone generator I (FIG. 11) in which the discharge surface material is the passivated insulation film $2104a$, raw gas that is gas (oxygen+500 ppm nitrogen gas) resulting from adding a trace amount of nitrogen gas to oxygen gas is caused to flow again through the test ozone generator I on the discharge surface after discharging with the high-purity oxygen gas (oxygen+0% nitrogen gas) for several hours, and the voltage having the rising characteristic A is applied.

Test Result Showing Relationship Between
Addition of Nitrogen Dioxide Gas of 18.4 ppm and
Ozone Generation The characteristic B20 represents an ozone concentration rising characteristic when, in the test ozone generator I (FIG. 11) in which the discharge surface material is the passivated insulation film $2104a$, raw gas that is gas (oxygen+18.4 ppm nitrogen gas) resulting from adding a trace amount of nitrogen dioxide gas to oxygen gas is caused to flow again through the test ozone generator I on the discharge surface after discharging with the high-purity oxygen gas (oxygen+0% nitrogen dioxide gas) for several hours, and the voltage having the rising characteristic A is applied.

Test Result Showing Relationship Between
Discharge Surface Material (Photocatalyst) and
Ozone Generation The characteristic B30 represents an ozone concentration rising characteristic when, in the test ozone generator II (FIG. 12) in which the discharge surface material is the photocatalyst insulation film $2104b$, raw gas that is high-purity oxygen gas (oxygen+0% nitrogen gas) is caused to flow again through the test ozone generator II on the discharge surface after discharging with the high-purity oxygen gas (oxygen+0% nitrogen gas) for several hours, and the voltage having the rising characteristic A is applied.

A characteristic S0 (long dashed double-dotted line) represents an assumed ozone concentration rising characteristic when it is assumed that high-concentration ozone can be generated only by collision between electrons generated by dielectric barrier discharge and oxygen gas molecules.

Further, a characteristic (ozone concentration rising characteristic region $1000a$) enclosed by a long dashed short dashed line rectangle shown in FIG. 13 and FIG. 14 is a region representing an ozone concentration rising characteristic by electrons assumed from results of actual measurement tests performed in the test ozone generators I, II, and it has been made clear that the characteristic do not coincide with the above-described characteristic S0 (long dashed double-dotted line).

Regarding the discharge-type ozone generator, it is said that a generation concentration (ozone generation amount) varies in a manner that depends on the raw gas type, the discharge surface material, and the like, and it is thus necessary for verification of a mechanism that can generate high-concentration ozone gas to determine whether what kind of factor contributes to the generation of ozone gas. For that purpose, a determination has been made that a cause factor can be almost determined by verifying the rising response of the generated ozone concentration with respect to the rising response of the output applied to the ozone generator depending on the differences of the raw gas type and discharge surface material in detail by the test. Then, it becomes clearer by re-verifying the characteristic data and the analysis facts disclosed in Patent Documents 1 to 6 of the prior art.

Therefore, we have checked, with the test ozone generators I, II having the discharge surface structures shown in FIG. 11 and FIG. 12, the ozone concentration rising response of ozone gas generated from the ozone generators with the following points made variable under fixed conditions of the raw gas flow rate of 1 L/min and the supplied power of 500 W.

(1) Test using the test ozone generator I having the discharge surface configuration (FIG. 11) where the material of the discharge surface is the dielectric 2103 and the passivated insulation film 2104a.

Ozone concentration rising characteristic B1: As a confirmation test, in order to check the discharge surface state and the generation of ozone gas, the ozone concentration rising characteristic with high-purity oxygen (oxygen+0% $N_2$ gas) and an initial discharge surface with no discharge made and immediately after being cleaned and dried was measured.

Ozone concentration rising characteristic B2: As a confirmation test, in oxygen+500 ppm $N_2$ gas, the ozone concentration rising characteristic with high-purity oxygen (oxygen+0% $N_2$ gas) in a discharge surface state after discharge to generate high-concentration ozone was measured.

Ozone concentration rising characteristic B3: As a confirmation test, the ozone concentration rising characteristic with high-purity oxygen (oxygen+0% $N_2$ gas) in a discharge surface state where the discharge surface is sufficiently cleaned by discharge with high-purity oxygen gas was measured.

As a result, the ozone concentration rising characteristics B1 to B3 as shown in FIG. 13 were obtained.

(2) Test to check effect of a gas type, using an ozone generator having the discharge surface configuration (FIG. 12) where the material of the discharge surface is the dielectric 2103 and the passivated insulation film 2104a.

As the effect of a gas type, in particular, a material resulting from adding nitrogen gas to oxygen gas is used as raw gas, in the test ozone generator I for obtaining normal high-concentration ozone, it is typical to use raw gas resulting from adding nitrogen of 1 to 2% to oxygen gas, but the nitrogen of 1 to 2% is too much to check the effect of nitrogen, the ozone generation amount is stable, but it failed to make the effect of nitrogen on ozone generation clear. Therefore, gas (oxygen+500 ppm $N_2$) resulting from a trace amount of nitrogen (500 ppm $N_2$ gas) to oxygen gas was used as raw gas that allows the effect of nitrogen on ozone gas generation to be made clearly and quantitatively evaluated. Further, since a trace amount of NOx gas is generated from nitrogen gas during discharge, gas (oxygen+18.4 ppm $NO_2$) containing a trace amount of nitrogen dioxide ($NO_2$) gas as a representative gas of NOx gas was also used.

Ozone concentration rising characteristic B10: As a confirmation test, the ozone concentration rising characteristic with the discharge surface after discharging with high-purity oxygen gas (oxygen+0% nitrogen gas) for several hours and raw gas using oxygen+500 ppm $N_2$ gas was measured again.

Ozone concentration rising characteristic B20: As a confirmation test, the ozone concentration rising characteristic with the discharge surface after discharging with high-purity oxygen gas (oxygen+0% nitrogen gas) for several hours and raw gas using oxygen+18.4 ppm $NO_2$ gas was measured again.

Ozone concentration rising characteristic B30: As a confirmation test, the ozone concentration rising characteristic with the discharge surface after discharging with high-purity oxygen gas (oxygen+0% nitrogen gas) for several hours and raw gas using high-purity oxygen (oxygen+0% $N_2$ gas) was measured again in the test ozone generator II having the discharge surface configuration (FIG. 12) where the material of the discharge surface is the dielectric 2103 and the photocatalyst insulation film 2104b.

As a result, the ozone concentration rising characteristics B10 to B30 as shown in FIG. 14 were obtained.

From the ozone concentration rising characteristic B1 shown in FIG. 13, it is confirmed that the concentration starts to rise in about 1 second after application of the output signal A (start of discharge), reaches the maximum concentration of 100 $g/m^3$ (52000 ppm) in about 10 seconds after the start of discharge, and then gradually decreases for about 1000 seconds (16.7 minutes) to reach a final concentration value of as small as 12 $g/m^3$ (5600 ppm).

From this result, since a characteristic can be obtained in which the concentration rises very slowly, that is, about 10 seconds after the output signal A is input, and the ozone concentration thus generated drops in about 1000 seconds, it is assumed that the generation of ozone gas depends on gas attached (adsorbed) to the discharge surface.

In other words, it is determined that the ozone gas generated in about 1 second to about 1000 seconds (16.7 minutes) depends on the fact that the discharge surface is the initial discharge surface, and discharge causes atmospheric components such as water and nitrogen gas attached (adsorbed) to the initial discharge surface to be released by collision of electrons and ions of the discharge, and the ozone gas is generated through oxygen dissociation caused by discharge with a trace amount of gas thus released and oxygen gas.

Next, from the ozone concentration rising characteristic B2 shown in FIG. 13, it is confirmed that the concentration starts to rise in about 1 second after application of the output signal A (start of discharge), is kept at 12 $g/m^3$ (5600 ppm) for 3 seconds after the start of discharge, reaches the maximum concentration of 210 $g/m^3$ (103500 ppm) in about 30 seconds to 50 seconds, and then gradually decreases for about 1000 seconds (16.7 minutes) to reach a final concentration value of as small as 12 $g/m^3$ (5600 ppm).

From this result, since a characteristic can be obtained in which the concentration rises very slowly, that is, about 30 seconds after the output signal A is input, and the ozone concentration thus generated drops in about 1000 seconds, it is assumed that the generation of ozone gas depends on gas attached (adsorbed) to the discharge surface. In other words, for ozone gas generated in about 30 seconds to about 1000 seconds (16.7 minutes), it is determined that, since discharge is made on the discharge surface with gas containing nitrogen gas in the previous discharge process, nitrogen compound gas generated during discharge is attached to the discharge surface by the discharge, discharge due to the nitrogen compound gas thus attached causes the nitrogen compound gas attached to the discharge surface to be released by collision of electrons and ions of the discharge, and ozone is generated through oxygen dissociation caused by discharge with a trace amount of nitrogen compound gas thus released and oxygen gas.

Furthermore, from the ozone concentration rising characteristic B3 shown in FIG. 13, it is confirmed that the concentration becomes 12 $g/m^3$ (5600 ppm) in about 1 second after the application of the output signal A (start of discharge), but does not exceed the concentration of 12 $g/m^3$.

From this result, when the ozone generator has a clean passivated insulation film with no atmospheric gas or nitrogen compound gas adhering (adsorbed) to the initial discharge surface, it has been made clear that only the ozone concentration of 12 $g/m^3$ (5600 ppm) can be obtained. Furthermore, with reference to the concentration response of 12 g/m³ (5600 ppm), ozone is generated with a response of about 1 second to the output voltage, and it is said that oxygen atoms are theoretically dissociated by discharge with an ozone generation response of about $10^{-5}$ (s) by electrons during discharge, and an ozone generation response time during which ozone is generated through three-body collision between the dissociated oxygen atoms and oxygen gas is about 1 (s), and thus the fact that the ozone concentration is 12 g/m³ (5600 ppm) with which ozone gas can be generated by electrons of discharge has been revealed by the test.

From the ozone concentration rising characteristic B10 with oxygen+500 ppm N₂ gas shown in FIG. 14 used as raw gas, it is confirmed that the concentration starts to rise in about 1 second after application of the output signal A (start of discharge), is kept at 12 g/m³ (5600 ppm) for about 40 seconds after the start of discharge, gradually rises in about 40 seconds after the start of discharge, and become saturated at about 100 g/m³ (52000 ppm) with a very slow response of about 3000 seconds (50 minutes) after the start of discharge.

From this result, it is determined from the ozone concentration rising characteristic B10 that, based on the fact that a high concentration of about 100 g/m³ (52000 ppm) is obtained with a very slow response to the input of the output signal A, a discharge output and nitrogen gas itself do not contribute to the generation of high-concentration ozone, and the high concentration of about 100 g/m³ (52000 ppm) is obtained by generating nitrogen oxide gas by discharge containing nitrogen.

It has been confirmed that, from the ozone concentration rising characteristic B10 shown in FIG. 14, as gas (oxygen+500 ppm N₂) resulting from adding a trace amount of nitrogen of 500 ppm N₂ gas to oxygen gas gradually increases in trace amount of nitrogen to be added to oxygen gas, a response time during which a high concentration is obtained is made shorter, and a maximum ozone concentration of gas (oxygen+1% N₂) resulting from adding a trace amount of nitrogen by about 1% increases up to 279 g/m³ (130000 ppm) (not shown in FIG. 14). In other words, it is determined that as the nitrogen oxide gas that contributes to the generation of high-concentration ozone increases in amount of added nitrogen to 1%, the nitrogen oxide gas generated by the discharge also increases, and, as a result, the generated ozone concentration also increases.

Next, from the ozone concentration rising characteristic B20 with raw gas using oxygen+18.4 ppm NO₂ shown in FIG. 14, it has been confirmed that the concentration starts to rise in about 1 second after application of the output signal SA (start of discharge), is kept at 12 g/m³ (5600 ppm) for 2 seconds after the start of discharge, reaches a concentration of 312 g/m³ (145500 ppm) in about 2 seconds to 30 seconds, and then high-concentration ozone having a concentration of about 350 g/m³ (163000 ppm) can be generated.

From this result, it has been made clear that, with consideration given to the fact that, from the ozone concentration rising characteristic B20, since the amount of nitrogen dioxide (18.4 ppm NO₂) added to oxygen gas in raw gas is much less than the amount of added nitrogen (500 ppm N₂), the ozone concentration rising response becomes fast, and high-concentration ozone can be generated and NOx gas is generated by discharge with nitrogen, nitrogen dioxide (NO₂) largely contributes to the generation of high-concentration ozone compared with nitrogen gas. Further, this assumption corresponds to a fact that agrees well with the technical contents disclosed in Patent Documents 1 to 6.

Furthermore, from the ozone concentration rising characteristic B30 with the test ozone generator II having the discharge surface configuration (FIG. 12) using the photocatalyst insulation film 2104b shown in FIG. 14 and raw gas using high-purity oxygen (oxygen+0% N₂ gas), it has been confirmed that the concentration starts to rise in about 1 second after application of the output signal A (start of discharge), and high-concentration ozone having the maximum concentration of 350 g/m³ (163000 ppm) can be generated in about 12 seconds.

From this result, it has been verified that, from the ozone concentration rising characteristic B30, even with raw gas that is high-purity oxygen gas containing neither nitrogen nor nitrogen dioxide unlike the ozone concentration rising characteristics B10, B20, when the test ozone generator test II having the discharge surface configuration (FIG. 12) where the material of the discharge surface is the dielectric 2103 and the photocatalyst insulation film 2104b, high-concentration ozone gas is generated with a relatively fast response.

Further, the characteristic S0 represented by a long dashed double-dotted line in FIG. 14 corresponds to a concentration rising characteristic on the assumption that the supplied oxygen gas is dissociated by the electrons generated by discharge to generate high-concentration ozone gas of 350 g/m³ (163000 ppm). In this case, since oxygen atoms are dissociated by electron collision of discharge, the response time during which the oxygen atoms are generated is about $10^{-5}$ (s) with respect to the output, and an ozone generation response time during which ozone is generated through three-body collision between the dissociated oxygen atoms and oxygen gas is about 1 (s), thereby immediately reaching a concentration exceeding 350 g/m³ (163000 ppm). Further, when high-concentration ozone is generated only by electrons, ozone gas is generated with a response faster than an increase in gas temperature due to discharge, thereby eliminating the need of decomposing the generated ozone due to gas temperature at a rising portion of the concentration. As a result, at the rising portion of the concentration, it is assumed that the ozone concentration overshoots like the characteristic S0 where the concentration increases, and the characteristic converges to a predetermined concentration around 3 (s).

The characteristic S0 on the assumption that a high concentration is obtained with electrons as described above has not been found in the test results of the ozone concentration rising characteristics B10 to B30. However, an ozone concentration with which it is likely that ozone is generated with a fast response of about 1 second corresponds to a characteristic of 12 g/m³ (5600 ppm).

Judging from the above results, it has been confirmed that the ozone concentration contributing to the generation of ozone gas by electrons is about 12 g/m³ (5600 ppm), and high-concentration ozone exceeding an ozone concentration of 200 g/m³ is not generated. These tests have proved that it is theoretically impossible. The tests have proved that at least nitrogen dioxide (NO₂) contained during discharge or the photocatalyst material of the discharge surface contributes to the generation of high-concentration ozone.

It has been said that when a stainless steel material surface is used as a conventional discharge surface material, a passivated surface is formed on the discharge surface, and high-concentration ozone can be extracted, but when this result is verified below, the discharge surface is formed of the photocatalyst insulation film 2104b made from $Cr_2O_3$, $Fe_2O_3$ or the like, thereby increasing the ozone generation capacity and allowing high-concentration ozone gas to be obtained.

Further, rather than continuous discharge such as glow discharge, dielectric barrier discharge is realized via a dielectric in a short gap discharge space. Since the dielectric barrier discharge is high electric field discharge, and this discharge has a mode of countless intermittent discharge, it is conceivable that oxygen dissociation is efficiently accelerated during the discharge by the effect of nitrogen dioxide of raw gas or the discharge surface material (photocatalyst insulation film 2104b, and dissociated oxygen atoms play a role of efficiently generating ozone gas during a rest period of this intermittent discharge mode. As a result, it is determined that the ozone generator 11 can generate high-concentration ozone gas exceeding 200 g/m$^3$ (93333 ppm) by dielectric barrier discharge.

Based on the above consideration, the ozone gas usage system including the ozone generation apparatus 100 according to of the present embodiment has become possible.

As described above, factors contributing to the generation of high-concentration ozone are found through this confirmation test for concentration rising response, which helps pursuit of the gas type or the discharge surface material to obtain ozone gas having a higher concentration, makes it possible to implement the ozone generation apparatus 100 (ozone generator 11) having a smaller apparatus configuration, and in turn makes the market for application apparatuses using ozone gas bigger.

As described above, with the electrode structure as shown in FIG. 12 employed, the ozone generator 11 can generate ozone gas having a high concentration exceeding 200 g/m$^3$ with the amount of NOx contained in the ozone gas suppressed to less than several ppm even from nitrogen (addition)-free oxygen gas containing nitrogen gas of less than 0.1% received from the raw gas purification apparatus 300 as raw gas.

After the above reverification, the ozone generation apparatus 100 including the ozone generator 11 is implemented, the ozone generator 11 being increased in ozone generation capacity and capable of extracting high-concentration ozone gas by applying a specific metal oxide material, that is, the photocatalyst insulation film 2104b, to the discharge surface of the ozone generator 11 that has been made small in size and has made raw gas nitrogen-free.

As described above, in the ozone gas usage system according to the present embodiment, the ozone generation apparatus 100 is miniaturized, and the raw gas purification apparatus 300 serves as an apparatus that extracts oxygen gas from water or air existing in the natural environment as a high-purity oxygen source and performs purification to produce high-purity oxygen.

Furthermore, with a small-scale power supply apparatus that generates at least several hundred watts of power as the power supply apparatus 400 configured by a part of small-scale renewable energy power generation using solar power, wind power, geothermal power, hydropower, wave power, and biomass power generation, the ozone gas usage system using global environment-friendly ozone is made available at any area or place.

Power Supply Apparatus 400

Figure 8:
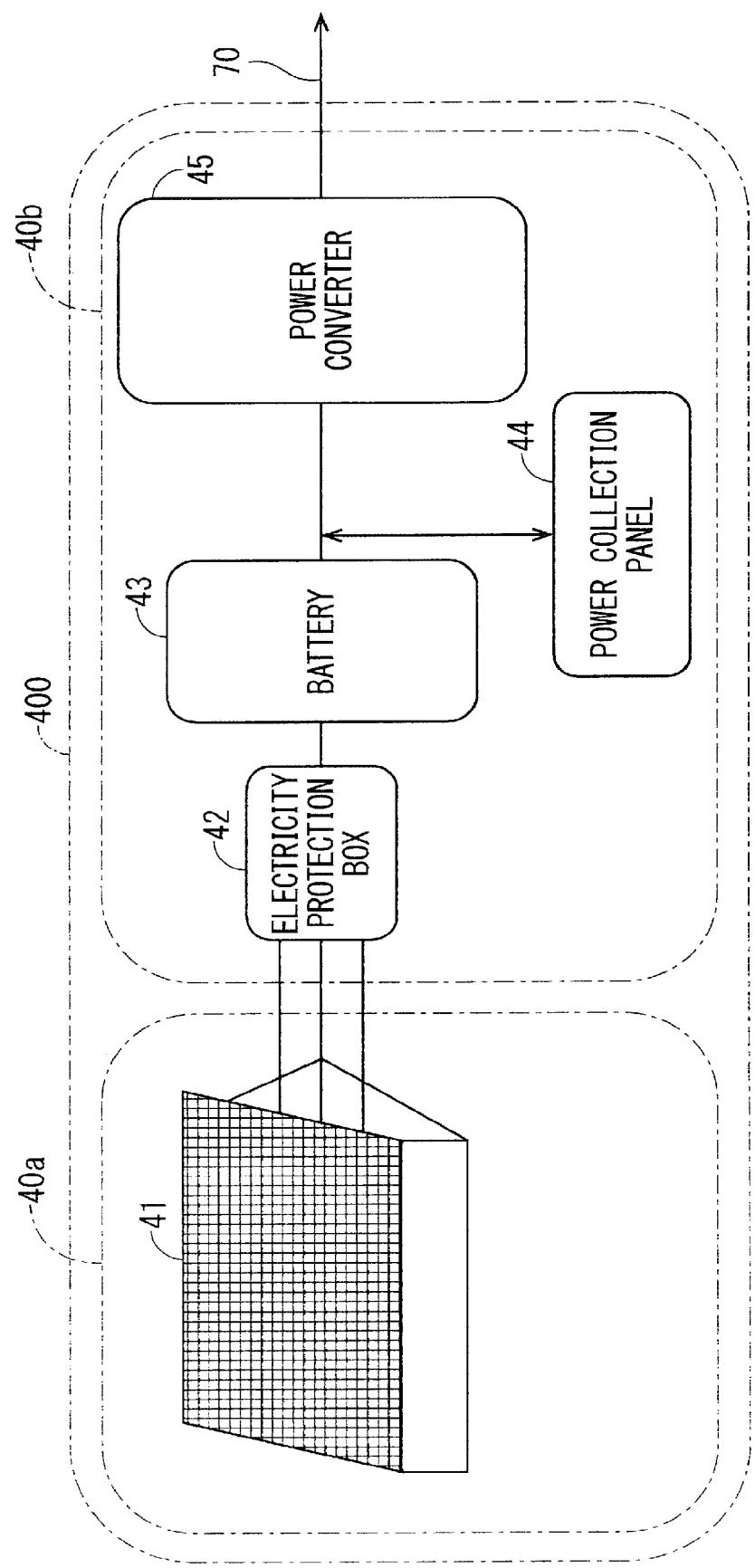
FIG. 8 is an explanatory diagram showing an example of a configuration where a power supply apparatus shown in FIG. 1 is a renewable energy power generation apparatus.

FIG. 8 is an explanatory diagram showing an example of a configuration where the power supply apparatus 400 is a renewable energy power generation apparatus that is one configuration example to be used in combination with the ozone generation apparatus 100.

As shown in FIG. 8, the power supply apparatus 400 includes a renewable energy power generation cell unit 40a and a generated power control unit 40b. The renewable energy power generation cell unit 40a includes a solar cell module array 41, and the generated power control unit 40b includes an electricity protection box 42, a battery 43, a power collection panel 44, and a power converter 45.

As described above, the renewable energy power generation cell unit 40a includes the solar cell module array 41 as renewable energy. The generated power control unit 40b collects and store electricity generated by the renewable energy power generation cell unit 40a and converts the electricity thus generated into a commercial AC source.

The electricity generated from one solar cell module array 41 is once collected into the power collection panel 44 through the electricity protection box 42 in the generated power control unit 40b. The electricity protection box 42 is provided between the renewable energy power generation cell unit 40a and the battery 43 of the generated power control unit 40b. The electricity protection box 42 makes a prevention measure at a time of lightning striking the renewable energy power generation cell unit 40a such as overheating, short circuit, or overvoltage in the renewable energy power generation cell unit 40a and makes a safety shut-off against troubles such as installation of a diode for preventing reverse current. Further, a sensor signal representing the amount of electricity generated from the renewable energy power generation cell unit 40a, a cell temperature, and the like, and a signal for requesting adjustment to the amount of electricity are transmitted to the generated power control unit 40b through the electricity protection box 42. The electricity generated by the solar cell module array 41 and received through the electricity protection box 42 is collected by the power collection panel 44, temporarily stored in the battery 43, and converted the DC source into the AC supply power source 70 by the power converter 45. Then, the generated electricity is constantly and stably supplied to the outside as the supply power source 70.

It is required that the power supply apparatus 400 including the solar cell module array 41 serving as a renewable energy power generation source not only generate and transmit electricity to the outside as described above, but also allow the electricity to be effectively used in an area where the electricity is generated, that is, "local production for local consumption". When nitrogen-free ozone gas can be generated with part of electricity from renewable energy power generation and ozone gas small in load on the environment can be used for various environmental measures such as air pollution, sterilization, water and sewage processing, and red tide measure in each area, a remote area, a remote island, or an isolated large ship, it is highly likely that desired improvement in local environment is brought about.

As described above, the power supply apparatus 400 uses the renewable energy power generation cell unit 40a on which the solar cell module array 41 serving as a renewable energy source is mounted to supply the supply power source 70 serving as an operating power source for the ozone generation apparatus 100.

Accordingly, the ozone gas usage system according to the present embodiment allows an application apparatus to perform the ozone usage processing even in a location such as a remote area, a remote island, or a ship where it is difficult to use an ordinary power source.

First Modification

A description will be given below of a first modification of the ozone gas usage system for implementing various water purification processing such as water purification of human drinking water, sewage purification of sewage or the like, water purification and sterilization of pool water, organic matter processing in an aquarium, and small-scale water environment improvement processing for sterilization processing.

Figure 9:
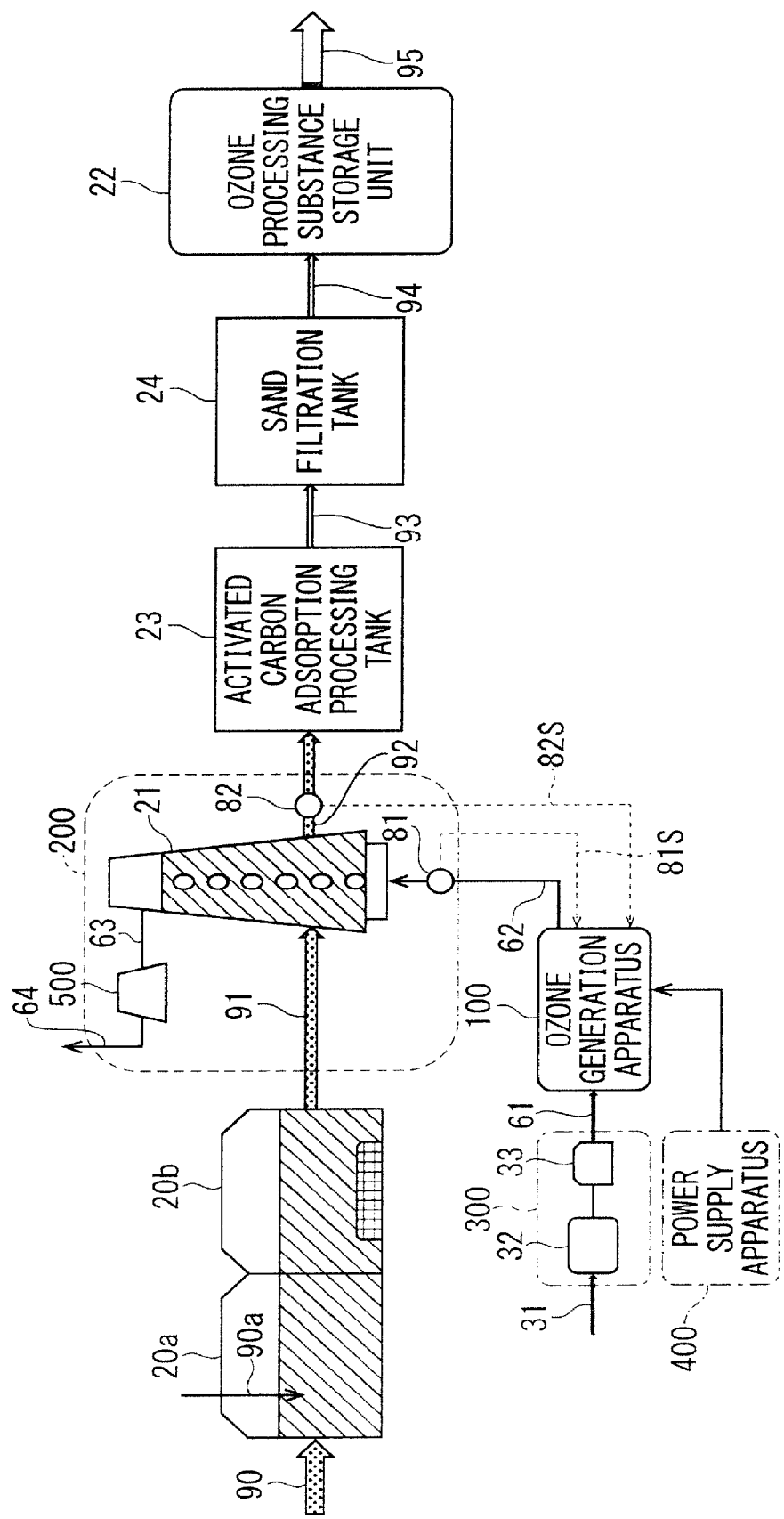
FIG. 9 is a block diagram showing a configuration of a first modification of the ozone gas usage system.

FIG. 9 is a block diagram showing a configuration of the first modification of the ozone gas usage system. In FIG. 9, to-be-processed water supplied from a coagulation sedimentation tank 20b is the pre-ozone processing substance 91. Hereinafter, a description will be given of the first modification with reference to FIG. 9 while appropriately omitting a description of components identical to the basic components of the embodiment shown in FIG. 1 to FIG. 8.

As shown in FIG. 9, chemical processing is performed on to-be-processed source water 90 by a neutralizer chemical 90a in a chemical mixing tank 20a, and then to-be-processed water that has been filtered to remove suspended matters in the coagulation sedimentation tank 20b is injected into the ozone gas processing reactor 21 of the application apparatus 200 as the pre-ozone processing substance 91.

An ozone space to which ozone gas is supplied is provided at the bottom of the ozone gas processing reactor 21, and fine holes (ejectors) are provided in the ozone space, and ozone gas is fed, as ozone gas bubbles, to the to-be-processed water in the processing tank of the ozone gas processing reactor 21 through the holes to permeate the to-be-processed water (pre-ozone processing substance 91) through a contact surface between the to-be-processed water and the ozone gas bubbles, so that the water purification processing such as oxidation decomposition of organic matters contained in the to-be-processed water and sterilization is performed using the ozone gas.

Then, ozone-processed water after the water purification processing is output to the activated carbon adsorption processing tank 23 as the post-ozone processing substance 92. The post-ozone processing substance 92 contains fine decomposition substances and heavy metal oxide metal substances such as manganese. The post-ozone processing substance 92 passes through the activated carbon adsorption processing tank 23 to become the activated carbon processed water 93, is temporarily stored in the ozone processing substance storage unit 22 as sand filtration processed water 94 that has been completely filtered through the sand filtration tank 24, and is then distributed and used as complete processed water 95 as necessary.

Therefore, since the ozone gas usage system according to the present embodiment includes the ozone processing substance storage unit 22 as the processing object storage unit, the post-ozone processing substance 92 can be used when necessary.

As described above, the amount of ozone gas used for water purification processing varies in a manner that depends on the to-be-processed source water 90, and the water purification processing using ozone water can be performed on conditions that ozone (gas) of about 2 to 5 mg/L is injected for normal to-be-processed water (water), and ozone (gas) of about 5 to 10 mg/L is injected for contaminated wastewater (sewage). For example, when ozone of 5 mg/L is injected, ozone gas with an ozone generation amount of 30 g/h is sufficient, the water purification processing using the ozone gas can be performed at 200 m$^3$/day, 1 kVA as the electric capacity of the ozone generator 11 is sufficient, and it is possible to build an ozone gas usage system that performs the water purification processing with a small electric capacity of about one half to one third as compared with the conventional ozone generator.

Further, it is sufficient that oxygen serving as raw gas be supplied at a rate of about 3 to 10 L/min, and when nitrogen gas and water content can be removed by a relatively small-scale oxygen PSA apparatus 32 and high-purity gas purifier 33, it can be done by the raw gas purification apparatus 300 having a very small apparatus configuration.

Furthermore, since the power supply apparatus 400 having a small capacity of about several kVA can constitute a part of the ozone gas usage system that adequately performs water purification processing, the use of the power supply apparatus 400 using a renewable energy source allows the ozone gas usage system that performs water purification processing made lower in load on the environment to be performed in a remote area or a remote island.

As described above, in the first modification of the ozone gas usage system, the water purification processing on the to-be-processed water that is the pre-ozone processing substance 91 is performed as the ozone usage processing performed by the application apparatus 200.

Therefore, in the first modification, the water purification processing can be performed by using the ozone generation apparatus 100 having a small electric capacity of about one half to one third as compared with the conventional ozone generation apparatus.

Second Modification

A description will be given below of a second modification of the ozone gas usage system serving as an environmental apparatus for water processing in a large passenger ship, water purification processing on ballast water in a container ship or a crude oil tanker.

Regarding the water processing in a large passenger ship, ballast water in a container ship or a crude oil tanker, aquatic organisms mixed in water used in ships at each port are scattered around the world's ports, which brings about a situation where the environment and eco system in each region are destroyed, and health and economic activity are damaged. Accordingly, the International Maritime Organization (IMO) adopted the "International Convention for the Control and Management of Ships' Ballast Water and Sediments" in 2004, and it is required that new ships that have a ballast tank of less than 5000 m$^3$ and are laid down in 2009 or later include water purification processing equipment for ballast water and that new ships that have a ballast tank of at least 5000 m$^3$ and are laid down in 2012 or later include water purification processing equipment for ballast water. It is also required that large passenger ships include equivalent water purification processing equipment.

Figure 10:
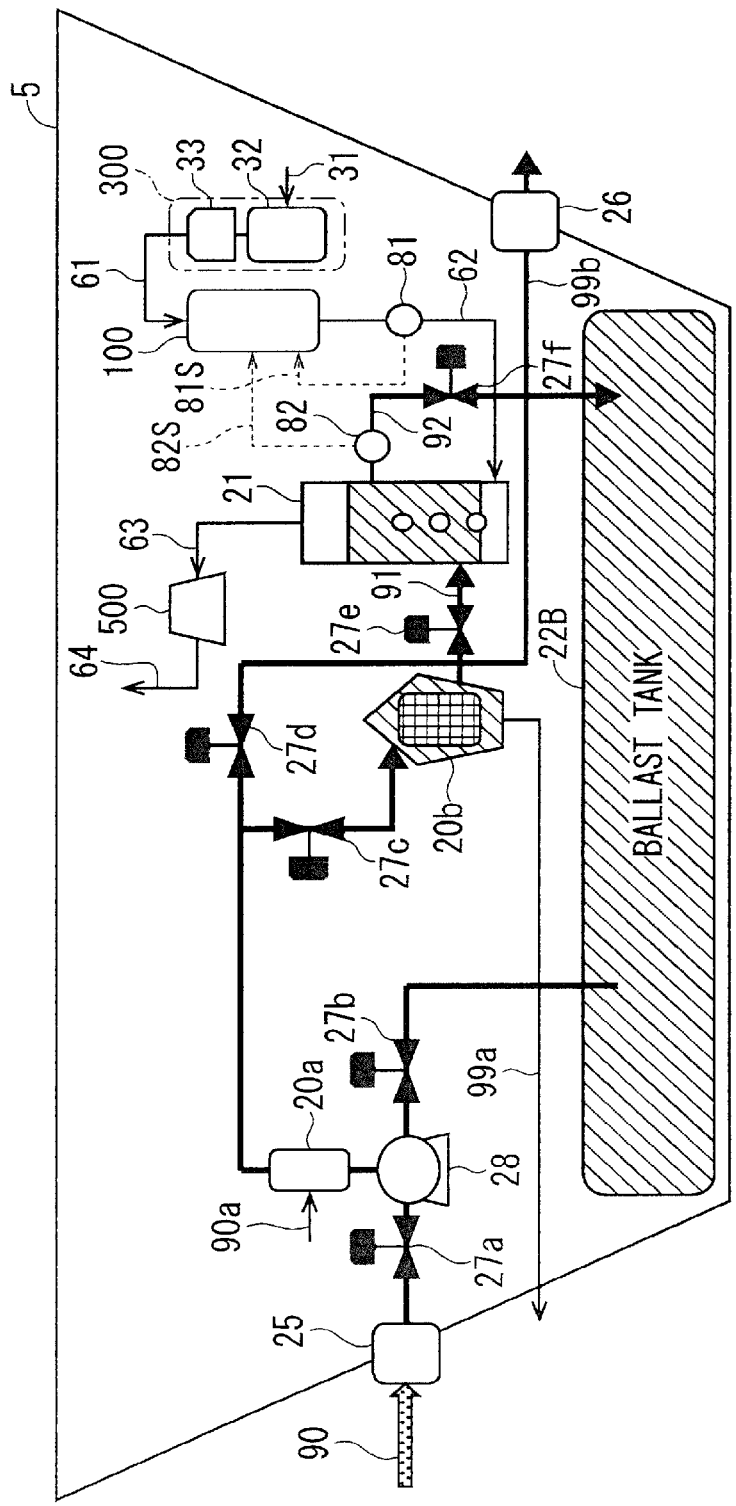
FIG. 10 is a block diagram showing a configuration of a second modification of the ozone gas usage system.

FIG. 10 is an explanatory diagram showing a configuration of the second modification of the ozone gas usage system using the ozone generation apparatus 100. In the second modification, the ozone gas usage system is built in a ship 5 such as a container ship or a crude oil tanker. Hereinafter, a description will be given of the second modification with reference to FIG. 10 while appropriately omitting a description of components identical to the basic components of the embodiment shown in FIG. 1 to FIG. 8.

In FIG. 10, seawater is supplied as the to-be-processed source water 90 from a ballast water intake 25 through an operation valve 27a and then injected, by a ballast water pump 28, from an operation valve 27b into a ballast tank 22B serving as the ozone processing substance storage unit through the chemical mixing tank 20a.

Next, the ballast water injected into the ballast tank 22B is again taken into the ballast water pump 28 through the operation valve 27b. Next, with the operation valve 27b closed and an operation valve 27c opened, the ballast water is injected, as the pre-ozone processing substance (to-be-processed water) 91, from the chemical mixing tank 20a into the ozone gas processing reactor 21 through the coagulation sedimentation tank (filter) 20b and an operation valve 27e. Then, the post-ozone processing substance 92 resulting from subjecting the pre-ozone processing substance 91 to water purification processing is returned from the upper portion of the ozone gas processing reactor 21 to the ballast tank 22B through an operation valve 27f. As described above, in the second modification of the ozone gas usage system, the water purification processing is performed while circulating the ballast water stored in the ballast tank 22B.

An ozone gas supply space to which ozone gas is supplied is provided at the bottom of the ozone gas processing reactor 21, and fine holes (ejectors) are provided in the ozone gas supply space, and ozone gas is fed, as ozone gas bubbles, to the to-be-processed water in the processing tank of the ozone gas processing reactor 21 through the holes to permeate the to-be-processed water through a contact surface between the to-be-processed water and the ozone gas bubbles, so that the water purification processing such as oxidation decomposition of organic matters contained in the to-be-processed water and sterilization is performed using the ozone gas.

The oxygen PSA apparatus 32 and the high-purity gas purifier 33 each having a relatively small configuration supply the high-purity oxygen gas 61 from which nitrogen gas and water content have been removed to the ozone generation apparatus 100 as raw gas.

With the ozone generator having the discharge surface of the ozone generation apparatus 100 formed of a specific photocatalyst, the ozone gas 62 containing almost no NOx gas can be generated from the high-purity oxygen gas 61, and this ozone gas 62 is supplied to the ozone space provided at the bottom of the ozone gas processing reactor 21, thereby making water purification processing using the ozone gas possible. Note that a ballast water drain outlet 26 serves as a drain outlet for distributing ballast water stored in the ballast tank 22B to the outside of the ship 5.

As described above, the ozone gas usage system of the second modification is implemented as the ozone water purification processing on ballast water stored in the ballast tank 22B in the ship 5 such as a container ship or a crude oil tanker.

As described above, the ozone gas usage system of the second modification including the ozone generator having the discharge surface of the ozone generation apparatus 100 formed of a specific photocatalyst and raw gas supplied to the ozone generator employ the ozone gas 62 containing almost no NOx gas using high-purity oxygen gas containing no nitrogen gas to perform ozone water purification processing on ballast water stored in the ballast tank 22B, thereby making it possible to implement ozone water purification processing low in load on the environment and make the system configuration small to an extent that the system can be installed in the ship 5.

Further, in the second modification, a description has been given of the water purification processing on ballast water in the ship 5 such as a container ship or a crude oil tanker, but when the ozone gas usage system is built using the ozone generator having the discharge surface of the ozone generation apparatus 100 formed of a specific photocatalyst, it is possible to implement ozone water purification processing low in load on the environment using the ozone gas 62 containing almost no NOx gas even in a case where ozone processing is performed on water or sewage in a large passenger ship.

Furthermore, a dedicated water processing ship equipped with the ozone gas usage system of the second modification is deployed at each port, and the ozone water purification processing on ballast water in a container ship or a crude oil tanker is performed by the dedicated water processing ship, thereby making it possible to supply processed water to the container ship or the crude oil tanker in a shorter time.

As described above, in the second modification of the ozone gas usage system, the ozone water purification processing on the to-be-processed water that is the pre-ozone processing substance 91 is performed as ozone usage processing performed by the application apparatus 200, and the system is built in the ship 5.

Accordingly, in the second modification, the ozone water purification processing can be performed in the ship 5 using the ozone generation apparatus 100 having a small electric capacity of about one half to one third as compared with the conventional ozone generation apparatus.

Furthermore, in the second modification, since the ballast tank 22B is provided as the processing object storage unit in which the post-ozone processing substance 92 is stored, the post-ozone processing substance 92 can be used when necessary.

In addition, in the second modification, since the water purification processing can be repeatedly performed in the ozone gas processing reactor 21 while circulating the ballast water in the ballast tank 22B, it is possible to stably keep the ballast water at a certain purification level.

Third Modification

In addition to the raw gas purification apparatus 300 that purifies high-purity oxygen gas, the power supply apparatus 400 serving as the renewable energy power generation apparatus and the ozone generation apparatus 100 that includes the ozone generator having the discharge surface formed of a specific photocatalyst are further combined to form the ozone gas usage system that performs the water purification processing using NOx-free ozone gas, thereby allowing small-scale seawater sterilization, red tide processing, and atmospheric gas sterilization to be achieved on a very small scale. Since this ozone gas usage system uses NOx-free ozone gas that is low in load on the environment, the ozone gas usage system can be used in any area and largely contributes to improvement in the environment.

As described above, in the third modification of the ozone gas usage system, the sterilization processing using seawater or atmospheric gas as the pre-ozone processing substance 91 is performed as ozone usage processing of the application apparatus 200, thereby allowing seawater sterilization or atmospheric gas sterilization to be achieved by a relatively compact ozone generation apparatus 100.

Other

The conventional application apparatus that performs water purification processing and the like as ozone usage processing is large in apparatus scale, and therefore, the amount of electric supply to an apparatus that generates ozone gas and the power source for generating ozone gas are very large. In addition, since the conventional ozone generator generates, by discharge, ozone gas from an air source or oxygen containing 1% (10000 ppm) nitrogen gas as raw gas, NOx is also generated, and the ozone gas thus generated contains harmful NOx.

For this reason, it was not possible to implement an ozone gas usage system that reduces NOx gas that is a load on the environment, is small in amount of electricity supply and power supply source for generating ozone gas, effectively generates, with low power, ozone gas in which harmful impurity gases such as NOx gas has been reduced, and includes an application apparatus that performs small-scale water purification processing using the ozone gas.

Therefore, the ozone gas usage system according to the present embodiment is built using the ozone generation apparatus 100 that employs the small-scale ozone generator employing, as an ozone generation technology, a nitrogen-free ozone generation technology for generating high-concentration ozone gas from nitrogen-free oxygen gas containing nitrogen gas of less than 0.1% serving as raw gas and having the discharge surface formed of a specific photocatalyst, and a high-frequency ozone power source using an inverter technology as a power source technology for the ozone generator.

Furthermore, the power supply apparatus 400 of the ozone gas usage system according to the present embodiment uses a small-scale power supply source using solar power, wind power, geothermal power, hydraulic power, wave power, biomass power generation, and the ozone generation apparatus 100 includes the ozone generator having the discharge surface formed of a specific photocatalyst, thereby allowing a small-scale system (environmental apparatus) using ozone gas in which NOx gas that is a load to the environment has been reduced to be implemented. As a result, the ozone gas usage system according to the present embodiment can perform small-scale environmental processing using ozone that can improve various environments even in a remote area, a remote island, an isolated large passenger ship, a tanker, or the like.

The ozone generation apparatus 100 that is a component of the ozone gas usage system according to the present embodiment is designed as follows. The frequency of the stepped-up high-frequency voltage 72 applied to the ozone generator 11 is increased to at least 10 kHz. Furthermore, in the load-resonant high-frequency step-up transformer 13, the conductor and magnetic shield cover 135 such as an aluminum plate covers the transformer core 131 via the transformer cooling holes 136 for cooling the core to prevent heat generation due to leakage magnetic flux in the transformer body and allow predetermined power to be input at a fixed frequency near a resonance frequency.

Further, as the ozone generation apparatus 100 is made small in size, an apparatus specification of a conventional large-scale application apparatus that performs, as ozone usage processing, the water purification processing using ozone gas is modified to a specification for small-scale apparatus, the small-scale raw gas purification apparatus 300 serves as a raw gas supply source, and the power supply apparatus 400 that is small in capacity and uses a renewable energy power source serves as an electric power source.

As described above, the ozone gas usage system according to the present embodiment can be built as an ozone gas usage system that is low in generation of NOx gas and low in load on the environment by employing the ozone generator that employs a miniaturization technology and a nitrogen-free ozone generation technology as an ozone generation technology and a power source technology and the power supply apparatus 400 that uses a small-scale power supply source using solar power, wind power, geo-thermal power, hydraulic power, wave power, biomass power generation, and using a high-frequency inverter power source including the load-resonant high-frequency step-up transformer 13.

This makes it possible to use the ozone gas usage system according to the present embodiment as a system that performs water purification processing in a remote area or a remote island as in the first modification and water purification processing on ballast water in a ship such as a tanker as in the second modification, and thus such a system is promising as a small-scale environment improvement processing apparatus for local environments.

Furthermore, the ozone gas usage system including the small-scale ozone generation apparatus and the small-scale application apparatus 200 that performs ozone usage processing can be used with ease even in disasters.

Although the present invention has been described in detail, the above descriptions are illustrative in all aspects, and the present invention is not limited by the descriptions. It is understood that innumerable modifications not illustrated can be envisaged without departing from the scope of the present invention.

The invention claimed is:

1. An ozone gas usage system comprising:
a raw gas supply apparatus configured to supply raw gas containing oxygen gas;
an ozone generation apparatus configured to generate ozone gas from said raw gas; and
an application apparatus configured to perform ozone usage processing to obtain a post-ozone processing substance from a pre-ozone processing substance using said ozone gas, wherein
said ozone generation apparatus includes
an inverter power source configured to generate a supply high-frequency voltage,
a resonant transformer configured to step up said supply high-frequency voltage to obtain a stepped-up high-frequency voltage, and
an ozone gas generator configured to receive said stepped-up high-frequency voltage from said resonant transformer as an operating voltage to generate, from said raw gas, said ozone gas having an ozone concentration of at least 200 $g/m^3$, and
said application apparatus receives said ozone gas having the ozone concentration of at least 200 $g/m^3$, under a pressure environment of at least 0.2 MPa, wherein
said inverter power source generates said supply high-frequency voltage having a high frequency of at least 10 kHz,
said resonant transformer includes
a transformer body configured to step up said supply high-frequency voltage to obtain said stepped-up high-frequency voltage, wherein
said transformer body includes a pair of transformer cores, a transformer molded coil, and a transformer gap spacer, and
said transformer gap spacer is interposed between said pair of transformer cores,
said resonant transformer further includes
an aluminum cover member provided above and below said transformer gap spacer with a cooling space provided between said transformer body and said aluminum cover member to prevent magnetic flux leaking from said transformer body from affecting an outside, said transformer body is directly air-cooled by a cooling air flowing through said cooling space.

2. The ozone gas usage system according to claim 1, further comprising a power supply apparatus configured to supply an operating power source for said ozone generation apparatus, wherein
   said power supply apparatus supplies said operating power source using a renewable energy source.

3. The ozone gas usage system according to claim 1, wherein
   said raw gas supply apparatus includes an oxygen extraction apparatus configured to extract oxygen gas from air or water.

4. The ozone gas usage system according to claim 1, wherein
   said ozone usage processing to be performed by said application apparatus includes water purification processing on water that is said pre-ozone processing substance.

5. The ozone gas usage system according to claim 4, wherein
   said pre-ozone processing substance includes water used in a ship.

6. The ozone gas usage system according to claim 1, wherein
   said application apparatus includes a processing object storage unit where said post-ozone processing substance is stored.

7. The ozone gas usage system according to claim 1, wherein
   said ozone usage processing to be performed by said application apparatus includes sterilization processing on seawater or atmospheric gas that is said pre-ozone processing substance.

8. An ozone gas usage system comprising:
   a raw gas supply apparatus configured to supply raw gas containing oxygen gas;
   an ozone generation apparatus configured to generate ozone gas from said raw gas; and
   an application apparatus configured to perform ozone usage processing to obtain a post-ozone processing substance from a pre-ozone processing substance using said ozone gas, wherein
   said ozone generation apparatus includes
      an inverter power source configured to generate a supply high-frequency voltage,
      a resonant transformer configured to step up said supply high-frequency voltage to obtain a stepped-up high-frequency voltage, and
      an ozone gas generator configured to receive said stepped-up high-frequency voltage from said resonant transformer as an operating voltage to generate, from said raw gas, said ozone gas having an ozone concentration of at least 200 $g/m^3$,
   said raw gas supply apparatus supplies, as said raw gas, oxygen gas containing nitrogen gas of less than 0.1%,
   said ozone gas generator has a discharge surface formed of a photocatalyst material, and
   said application apparatus receives said ozone gas having the ozone concentration of at least 200 $g/m^3$, under a pressure environment of at least 0.2 MPa, wherein
   said inverter power source generates said supply high-frequency voltage having a high frequency of at least 10 kHz,
   said resonant transformer includes
      a transformer body configured to step up said supply high-frequency voltage to obtain said stepped-up high-frequency voltage, wherein
      said transformer body includes a pair of transformer cores, a transformer molded coil, and a transformer gap spacer, and
      said transformer gap spacer is interposed between said pair of transformer cores, said resonant transformer further includes
      an aluminum cover member provided above and below said transformer gap spacer with a cooling space provided between said transformer body and said aluminum cover member to prevent magnetic flux leaking from said transformer body from affecting an outside, said transformer body is directly air-cooled by a cooling air flowing through said cooling space.

9. The ozone gas usage system according to claim 8, further comprising a power supply apparatus configured to supply an operating power source for said ozone generation apparatus, wherein
   said power supply apparatus supplies said operating power source using a renewable energy source.

10. The ozone gas usage system according to claim 8, wherein
    said raw gas supply apparatus includes
    an oxygen extraction apparatus configured to extract oxygen gas from air or water, and
    an oxygen gas purifier configured to generate, as said raw gas, high-purity oxygen gas from oxygen gas obtained from said oxygen extraction apparatus.

11. The ozone gas usage system according to claim 8, wherein
    said ozone usage processing to be performed by said application apparatus includes water purification processing on water that is said pre-ozone processing substance.

12. The ozone gas usage system according to claim 11, wherein
    said pre-ozone processing substance includes water used in a ship.

13. The ozone gas usage system according to claim 8, wherein
    said application apparatus includes a processing object storage unit where said post-ozone processing substance is stored.

14. The ozone gas usage system according to claim 8, wherein
    said ozone usage processing to be performed by said application apparatus includes sterilization processing on seawater or atmospheric gas that is said pre-ozone processing substance.

* * * * *